US012663097B2

(12) United States Patent
Kanai

(10) Patent No.: US 12,663,097 B2
(45) Date of Patent: Jun. 23, 2026

(54) CONTROL VALVE

(71) Applicant: KOGANEI CORPORATION, Koganei (JP)

(72) Inventor: Ryoji Kanai, Tokyo (JP)

(73) Assignee: KOGANEI CORPORATION, Tokyo (JP)

( * ) Notice: Subject to any disclaimer, the term of this patent is extended or adjusted under 35 U.S.C. 154(b) by 0 days.

(21) Appl. No.: 18/851,865

(22) PCT Filed: Mar. 24, 2023

(86) PCT No.: PCT/JP2023/011895
§ 371 (c)(1),
(2) Date: Sep. 27, 2024

(87) PCT Pub. No.: WO2023/190192
PCT Pub. Date: Oct. 5, 2023

(65) Prior Publication Data
US 2025/0207684 A1      Jun. 26, 2025

(30) Foreign Application Priority Data

Mar. 30, 2022    (JP) ................................. 2022-056383
Mar. 20, 2023    (JP) ................................. 2023-044182

(51) Int. Cl.
*F16K 31/524*          (2006.01)
*F16K 7/16*            (2006.01)

(52) U.S. Cl.
CPC .......... *F16K 31/52491* (2013.01); *F16K 7/16* (2013.01); *F16K 31/52408* (2013.01)

(58) Field of Classification Search
CPC ............. F16K 31/524; F16K 31/52408; F16K 31/52491; F16K 7/16
See application file for complete search history.

(56) References Cited

FOREIGN PATENT DOCUMENTS

| | | | | | |
|---|---|---|---|---|---|
| CH | 275915 | A | * | 6/1951 | ....... F16K 31/52408 |
| CN | 105257861 | A | * | 1/2016 | ............... F16K 7/16 |
| CN | 115435112 | A | * | 12/2022 | ............... F16K 7/16 |
| GB | 1374241 | A | * | 11/1974 | ....... F16K 31/52408 |
| JP | H08270825 | A | | 10/1996 | |
| JP | 2004211867 | A | | 7/2004 | |

(Continued)

OTHER PUBLICATIONS

Machine English translation of CH-275915-A (Year: 2025).*

(Continued)

*Primary Examiner* — Hailey K. Do
(74) *Attorney, Agent, or Firm* — McCormick, Paulding & Huber PLLC

(57)          ABSTRACT

A control valve (flow-rate regulator valve (16)) includes: a valve housing (20) including a flow channel block (21) with a flow channel in which a fluid flows; a valve assembly (50) mounted on the valve housing (20) to be movable in a first direction and provided with a valve body (31) configured to change the degree of the communication opening of the flow channel; and an operation shaft (51*a*) including a shaft section (53) inserted into an insertion hole (52) formed in the valve housing (20) and a tapered shaft section (54) being in contact with the valve assembly, and a position of the valve body through the tapered shaft section is adjusted by motion of the operation shaft in a second direction.

13 Claims, 23 Drawing Sheets

(56)                    References Cited

FOREIGN PATENT DOCUMENTS

JP          2008256148  A     10/2008
JP          2021156374  A     10/2021

OTHER PUBLICATIONS

Machine English translation of CN-105257861-A (Year: 2025).*
Machine English translation of CN-115435112-A (Year: 2025).*
International Search Report mailed on Jun. 13, 2023, in connection
with corresponding International Application No. PCT/JP2023/
011895 (4 pp.).

* cited by examiner ( A )

A : ROTATION DRIVING SHAFT 51a
B : ROTATION DRIVING SHAFT51b
C : ROTATION DRIVING SHAFT51c
D : DIFFERENTIAL SCREW
(COMPARATIVE EXAMPLE)

NUMBER OF ROTATIONS OF ADJUSTING SCREW

FLOW RATE ( A )

ONE SIDE ⟵⟶ THE OTHER SIDE

B2

( B )

143

159a
143a
142

159b    159
143b
137

R

L d

170 {
170a
170b
170c 170d
141
144 ×

150

49
122

33    34    32   36    35     21

31

THE OTHER SIDE
B1

ONE SIDE (A)

322c
399
390
391
331

317
315

291
270
290
222c
299

12

28b  335    36  35  28a  L
31

THE OTHER SIDE
↑ B1
↓
ONE SIDE (B)

SUPPLYING →
322c
399
390
391
331

317
315

291
270
290
222c ← SUPPLYING
299

12

28b  335    36  35  28a  L
31

THE OTHER SIDE
↑ B1
↓
ONE SIDE

THE OTHER SIDE

B1

ONE SIDE ← → THE OTHER SIDE

B2

ONE SIDE

415

57

51a

54

423a

470

480

480c

449

461

470d

490

499b

422c

28b 31  36  35  28a

THE OTHER SIDE

B1

ONE SIDE ← → THE OTHER SIDE

B2

ONE SIDE

CONTROL VALVE

CROSS-REFERENCE TO RELATED APPLICATIONS

This application is a National Stage application of International Patent Application No. PCT/JP2023/011895, filed on Mar. 24, 2023, which claims priority to Japanese Patent Application No. 2022-056383, filed Mar. 30, 2022, and Japanese Patent Application No. 2023-044182, filed Mar. 20, 2023 each of which is hereby incorporated by reference in their entirety.

TECHNICAL FIELD

The present invention relates to a control valve capable of accurately adjusting a degree of a communication opening or a volume of a flow channel in which a fluid flows.

BACKGROUND

A flow-rate regulator valve is used in a liquid supply flow channel configured to supply a liquid to an object to be coated. A Patent Document 1 discloses a control valve for pure water configured to flow a small amount of pure water. The control valve includes a valve body made of diaphragm, and regulates a degree of an opening between the valve body and a valve seat, that is a degree of a valve opening, by using an adjusting rod made of a male screw member. In order to finely regulate the degree of the valve opening, the control valve includes a worm wheel fixed on the adjusting rod and a worm meshed therewith, and the degree of the valve opening is adjusted by rotation of the worm.

A Patent Document 2 discloses a flow-rate control valve attached together with a flow channel opening/closing valve to a flow channel block. In the flow-rate control valve, the degree of the valve opening of the valve body made of the diaphragm is adjusted by an adjusting screw member. The adjusting screw member includes a hollow shaft with a male screw on its outer surface and a female screw on its inner surface, and a differential shaft screwed to the female screw of the hollow shaft.

Patent Document 1: Japanese Patent Application Laid-open Publication No. H08-270825
Patent Document 2: Japanese Patent Application Laid-open Publication No. 2008-256148

SUMMARY

In the example described in the Patent Document 1, a motion amount of the valve body moved by the adjusting rod fixed on the worm wheel is 0.35 mm per rotation, and a discharged water amount per an about 0.09-mm motion amount caused by ¼ rotation is about 50 cc per minute. The valve body needs to be adjusted with 0.002- to 0.003-mm interval in order to finely change the amount of the discharged pure water. In order to move the valve body at a minute stroke, the worm attached to a knob is meshed with the worm wheel, and rotation of the knob is converted into rotation of the worm wheel at a reduction ratio of ½₀ rotation to rotate the adjusting rod.

However, in order to rotate the adjusting rod to a minute angle, the knob needs to be rotated to a minute angle of one rotation or less even under use of the worm. In order to increase the rotation angle of the knob, the pitch of the male screw of the rotation rod or the screw pitch of the worm needs to be decreased. However, creation of such screws is limited, and is difficult in terms of technique and cost. Additionally, the flow-rate regulator valve has a complicated configuration including the two screw members that are the worm wheel and the adjusting rod made of the male screw member.

Further, as described in the Patent Document 2, in the flow-rate control valve using the adjusting screw member, the degree of the opening of the regulator valve body is set by motion of 0.05 mm per rotation of the adjusting knob in a shaft direction. The screw pitch needs to be changed in order to more finely adjust the flow rate by use of the adjusting screw member. However, the screw pitch is difficult to change in terms of technique and cost. Additionally, the flow-rate regulator valve has a complicated structure that is two-step screw structure with the hollow shaft and the differential shaft.

Further, recently, there is the increasing need to more accurately regulate the flow-rate than ever, and a flow-rate control valve capable of accurately and easily regulating the degree of the communication opening or the volume even at a low flow rate (minute flow rate) has been awaited for a flow-rate control valve configured to change the degree of the communication opening or the volume of the flow channel.

An objective of the present invention is to provide a control valve capable of accurately and easily regulating a degree of a communication opening or a volume of a flow channel in a simple configuration.

A control valve according to the present invention includes: a valve housing including a flow channel block with a flow channel in which a fluid flows; a valve assembly mounted on the valve housing to be movable in a first direction and provided with a valve body configured to change a degree of a communication opening of the flow channel; and an operation shaft including a shaft section inserted into an insertion hole formed in the valve housing and a tapered shaft section being in contact with the valve assembly, and the operation shaft is moved in a second direction to adjust a position of the valve body through the tapered shaft section.

The operation shaft is moved in the second direction to adjust the position of the valve body through the tapered shaft section, and therefore, the degree of the communication opening or the volume of the fluid can be accurately and easily adjusted in a simple configuration.

BRIEF DESCRIPTION OF THE DRAWINGS

FIG. 2(A) is a front view, and FIG. 2(B) is a plan view.

FIG. 3 is an enlarged cross-sectional view taken along the line A-A of FIG. 2 in a state in which a valve body is closed.

FIG. 12(A) is a front cross-sectional view, and FIG. 12(B) is a cross-sectional view taken along the line D-D of FIG. 12(A).

DETAILED DESCRIPTION

Figure 1:
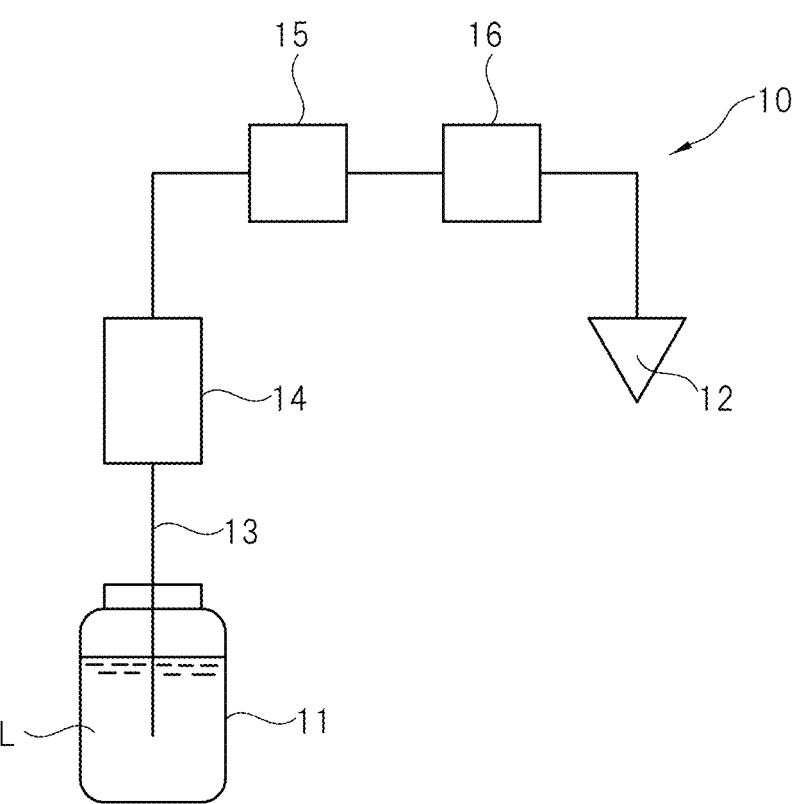
FIG. 1 is a piping diagram illustrating a liquid supply apparatus in which a flow-rate regulator valve is provided in a liquid supply pipe between a liquid container and a liquid application nozzle.

Embodiments of the present invention will be described in detail below with reference to the drawings. Note that the members which are different in shape but the same in function will be denoted with the same reference numeral in each embodiment.

A liquid supply apparatus 10 of FIG. 1 includes a liquid supply pipe 13 configured to supply a liquid L such as a photoresist liquid housed in a liquid container 11 to an application nozzle 12. The liquid supply pipe 13 is provided with a pump 14 configured to discharge the liquid L to the application nozzle 12. The liquid supply pipe 13 is provided with an opening/closing valve 15 configured to open/close a flow channel of a fluid in the liquid supply pipe 13 and a flow-rate regulator valve 16 configured to regulate the flow rate of the liquid flowing in the flow channel and supplied to the application nozzle 12. The opening/closing valve 15 and the flow-rate regulator valve 16 may be attached as an integrated body to a common member as described in the Patent Document 2.

First Embodiment

A control valve according to a first embodiment is the flow-rate regulator valve 16 configured to regulate the flow rate of the fluid in the flow channel, and has a feature (referred to as "first feature point" below) in which the position of a valve body 31 can be adjusted by motion (motion by rotation in the present embodiment) of an operation shaft 51a with a tapered shaft section 54.

Figure 2:
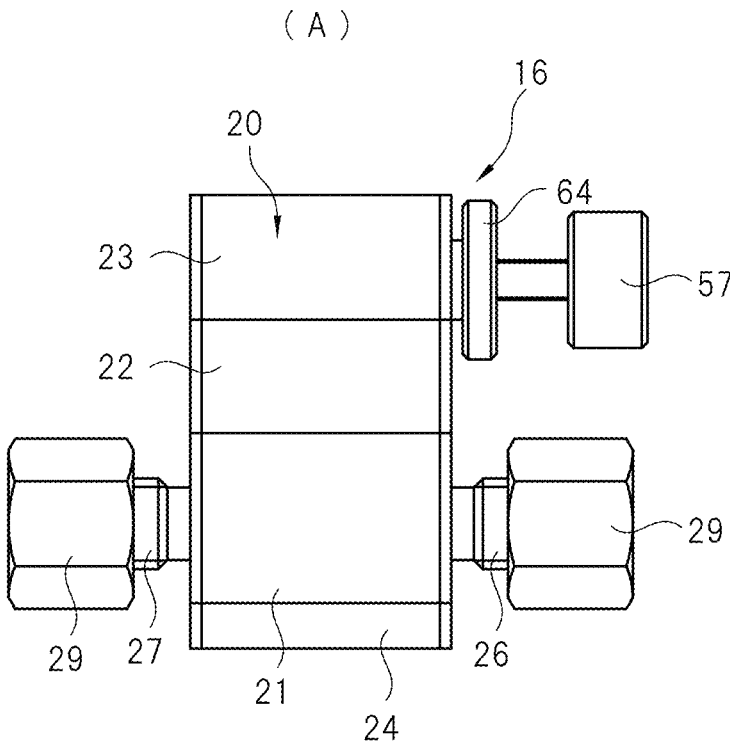
FIG. 2 is diagrams illustrating appearances of a flow-rate regulator valve as an exemplary control valve according to one embodiment.
Figure 2:
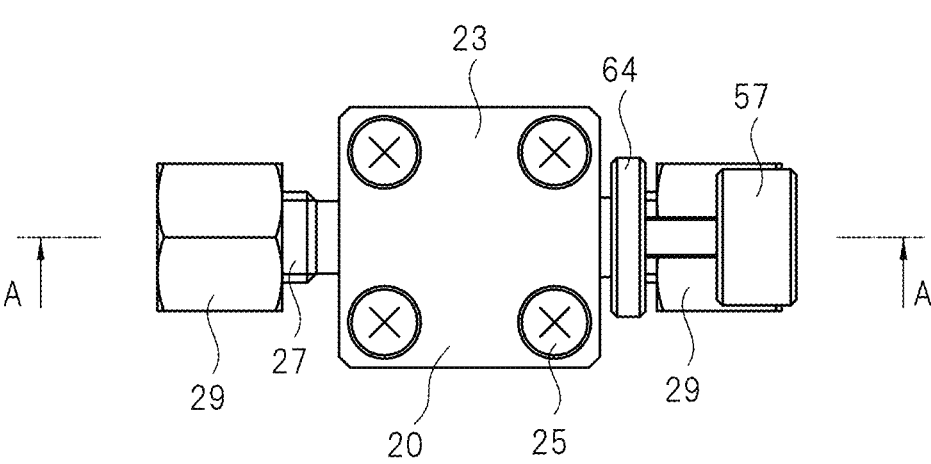
Figure 3:
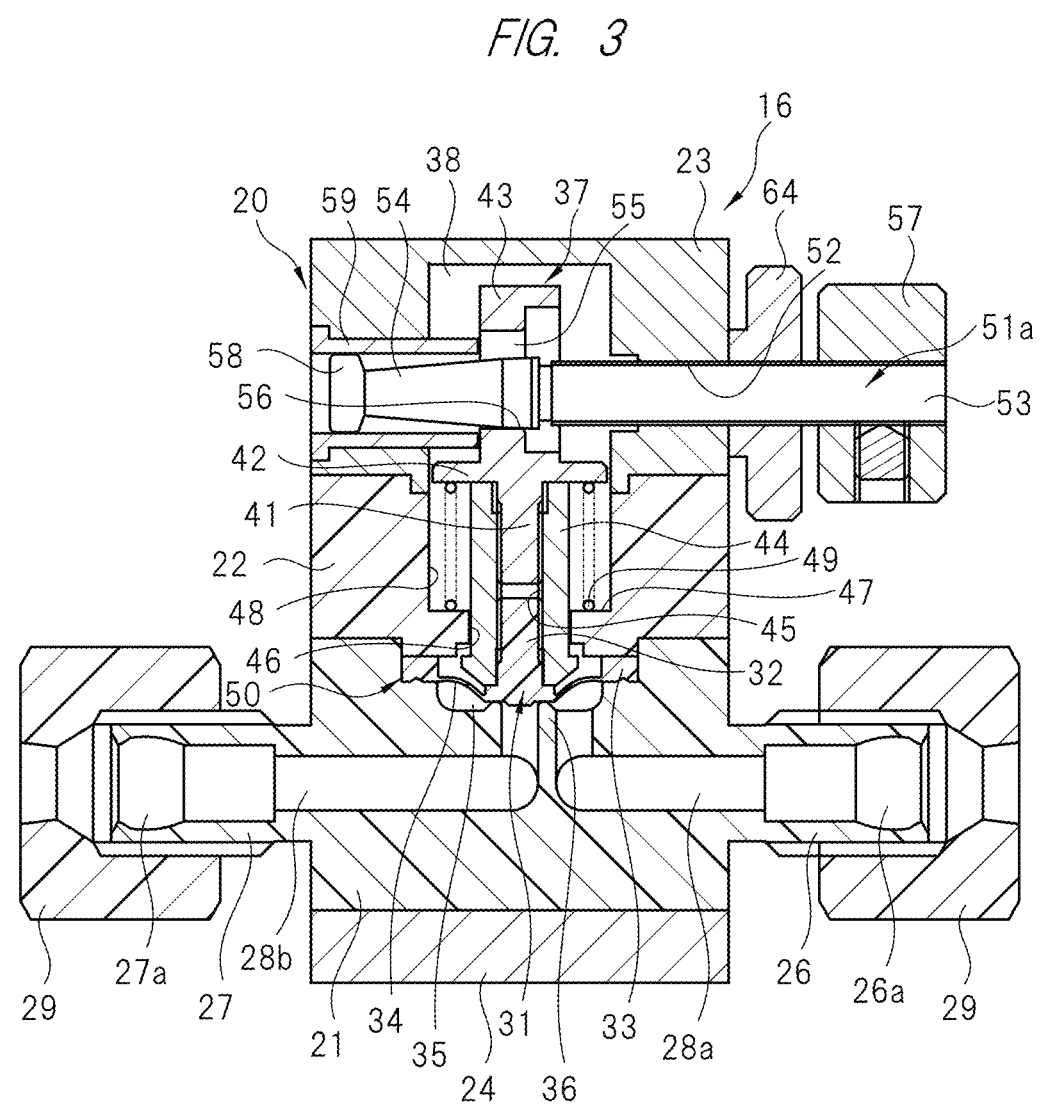
Figure 5:
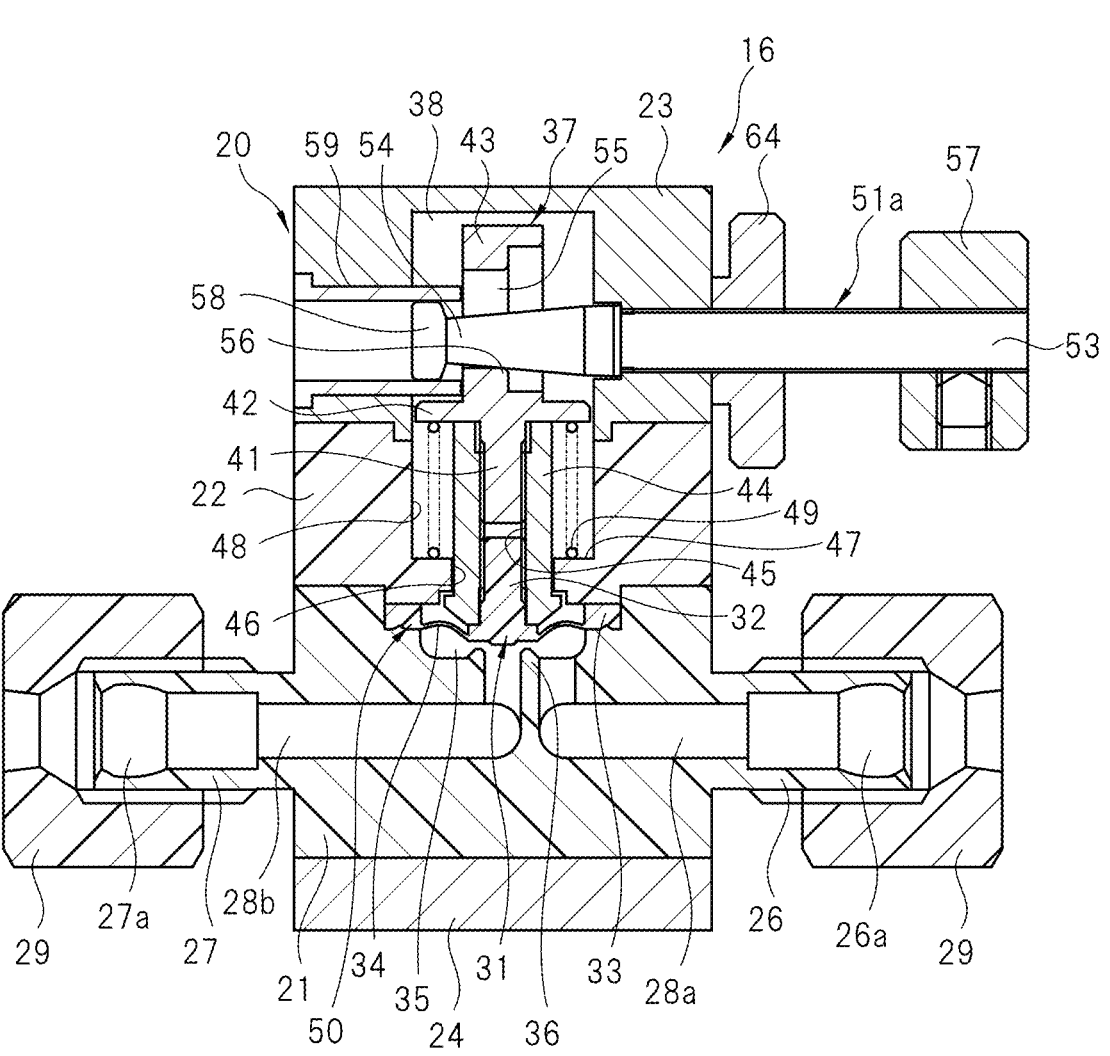
FIG. 5 is an enlarged cross-sectional view taken along the line A-A of FIG. 2 in a state in which the valve body is open.

The flow-rate regulator valve 16 includes a valve housing 20 made of a plurality of blocks as illustrated in FIG. 2, FIG. 3, and FIG. 5. The valve housing 20 includes a flow channel block 21, a valve block 22 attached on the flow channel block 21, and an upper block 23 attached on the valve block 22. Each of the flow channel block 21, the valve block 22, and the upper block 23 is almost cuboid. A support plate 24 is arranged on the lower surface of the flow channel block 21, and the flow channel block 21 and the valve block 22 are fastened between the upper block 23 and the support plate 24 by a plurality of screw members 25 as illustrated in FIG. 2(B). The flow channel block 21 and the valve block 22 are made of fluororesin, a metal material, or a resin material such as POM or PPS, and the upper block 23 and the support plate 24 are made of a metal material. The upper, lower, right, and left sides of the flow-rate regulator valve 16 are based on the position of FIG. 3 and FIG. 5, and an upper-and-lower direction is assumed as a first direction while a right-and-left direction is assumed as a second direction.

The flow channel block 21 is provided with a first joint 26 with an inflow/outflow port 26a and a second joint 27 with an inflow/outflow port 27a. Both the joints 26 and 27 are coaxially arranged, and protrude from both the right and left side surfaces of the flow channel block 21, respectively. An inflow channel 28a communicating with the inflow/outflow port 26a and an outflow channel 28b communicating with the inflow/outflow port 27a are formed in the flow channel block 21. Pipes not illustrated are mounted on the joints 26 and 27, and are fixed to the joints 26 and 27 by union nuts 29, respectively. In the liquid supply apparatus 10 of FIG. 1, the inflow/outflow port 26a in the flow-rate regulator valve 16 is connected to the outflow port of the opening/closing valve 15, and the inflow/outflow port 27a is connected to the application nozzle 12. However, if it is assumed that the channel 28a and the channel 28b of the flow channel block 21 are outflow and inflow sides, respectively, the inflow/outflow port 27a may be connected to the outflow port of the opening/closing valve 15 while the inflow/outflow port 26a may be connected to the application nozzle 12.

The valve body 31 is embedded in the flow channel block 21 as illustrated in FIG. 3 and FIG. 5. The valve body 31 is a diaphragm valve including a shaft 32 at its center in a radial direction, an annular section 33 arranged in the flow channel block 21 and sandwiched between the flow channel block 21 and the valve block 22, and an elastic deformation section 34 between the annular section 33 and the shaft 32, and is made of fluororesin. A communicating unit 35 configured to communicate the inflow channel 28a and the outflow channel 28b is formed between the valve body 31 and the flow channel block 21. The valve body 31 is movable to be close to and away from a valve seat 36 (in other words, movable in the first direction), and changes the degree of the communication opening of the flow channel made of the inflow channel 28a and the outflow channel 28b, in other words, the degree of the opening of the valve body 31.

Figure 7:
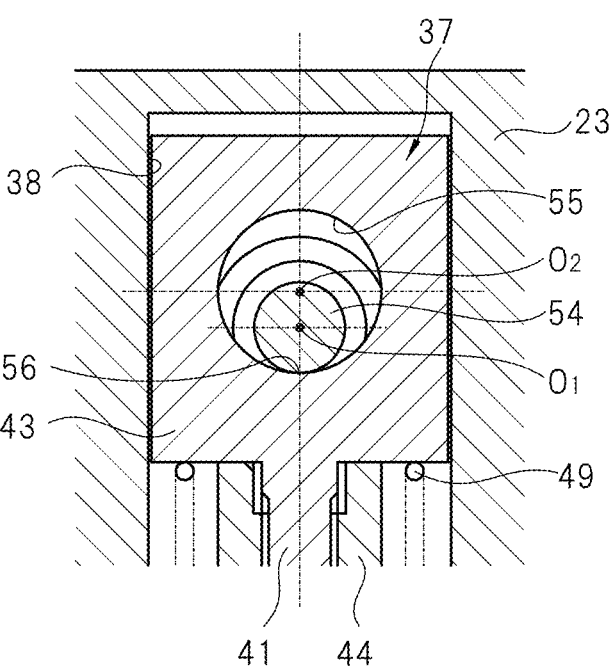
FIG. 7 is an enlarged cross-sectional view taken along the line B-B of FIG. 6.
Figure 8:
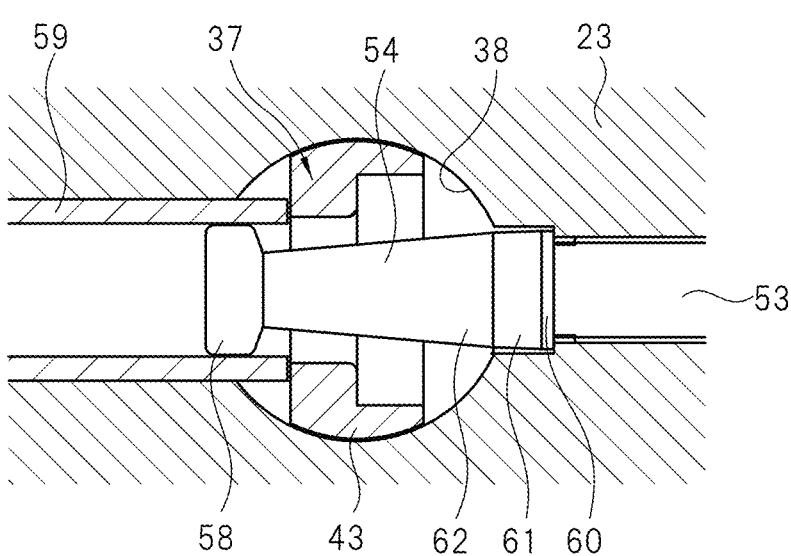
FIG. 8 is a cross-sectional view taken along the line C-C of FIG. 6.

An adjusting member 37 is embedded in an enclosure hole 38 formed in the upper block 23. The adjusting member 37 is an exemplary first adjusting member. The adjusting member 37 includes a shaft 41 arranged in coaxial with the shaft 32 of the valve body 31, and a large-diameter flange 42. A drive piece 43 is provided integrally with the flange 42, and the drive piece 43 is in contact with the inner circumference of the enclosure hole 38 as illustrated in FIG. 7 and FIG. 8. The shaft 32 and the shaft 41 are coupled by a coupling sleeve 44. A female screw 45 is formed on the inner circumference of the coupling sleeve 44, and a male screw formed on the shaft 32 and a male screw formed on the shaft 41 are screwed to the female screw 45 of the coupling sleeve 44. The valve body 31 and the adjusting member 37 are assembled by the coupling sleeve 44 to configure a valve assembly 50.

The coupling sleeve 44 penetrates through a through-hole 46 formed in the valve block 22 and protrudes into the flow channel block 21, and a step 47 continuing the through-hole 46 is formed in the valve block 22. An enclosure hole 48 continuing the step 47 is formed in the valve block 22. A compressed spring 49 as a spring member is embedded in the enclosure hole 48, and one end of the compressed spring 49 abuts on the flange 42 while the other end thereof abuts on the step 47. Spring force is applied to the valve body 31 by the compressed spring 49 in the direction of bringing the valve body 31 away from the valve seat 36.

An operation shaft 51a is a rotation shaft which is movable in the second direction (right-and-left direction) and moves while rotating in the present embodiment. The operation shaft 51a is inserted into an insertion hole 52 formed in the upper block 23, and the operation shaft 51a includes a shaft section 53 and a tapered shaft section 54 integral with the shaft section 53. The shaft section 53 includes a male screw on its outer circumference, and is screwed to a female screw formed on an inner circumference of the insertion hole 52. The tapered shaft section 54 penetrates through a through-hole 55 formed in the drive piece 43 of the adjusting member 37, and is in contact with a contact section 56 that is a lower portion of the inner surface of the through-hole 55.

The inner diameter of the through-hole 55 is set larger than the largest diameter of the tapered shaft section 54, and the rotation center O1 of the tapered shaft section 54 shifts from the center point O2 of the through-hole 55 as illustrated in FIG. 7. Actually, as the drive piece 43 provided with the contact section 56, the drive piece 43 may not be provided with the through-hole 55 in a structure with the contact section 56 in which the tapered shaft section 54 crosses the adjusting member 37.

By rotation of the operation shaft 51a, the operation shaft 51a is moved in its shaft direction (in the second direction) relative to the upper block 23. This direction is a direction crossing the motion direction of the adjusting member 37. A proximal end of the shaft section 53 protrudes outside the upper block 23, and an operation section 57 is attached to the protruding section. By operator's manual operation on the operation section 57, the operation shaft 51a is manually rotated. However, the operation shaft 51a may be driven by a rotation drive source such as an electric motor.

A head 58 with a larger diameter than that of the tapered shaft section 54 is provided at an end of the tapered shaft section 54, and a guide sleeve 59 configured to rotatably support the head 58 is fixed to the upper block 23. The guide sleeve 59 guides motion of the head 58 in the shaft direction (in the second direction), the motion caused by the rotation of the operation shaft 51a. An inner end surface of the guide sleeve 59 abuts on the drive piece 43 as illustrated in FIG. 8, and the guide sleeve 59 limits the rotation of the drive piece 43.

As described above, the valve assembly 50 which is made of the valve body 31, the adjusting member 37, and the coupling sleeve 44 to adjust the degree of the opening of the flow channel, and the operation shaft 51a which is movable to penetrate through the drive piece 43 of the adjusting member 37 and to cross the adjusting member 37 are embedded in the valve housing 20. Spring force is applied to the valve body 31 by the compressed spring 49 in the direction of bringing the valve body 31 away from the valve seat 36. Additionally, the valve assembly 50 is pushed upward by bias force of the compressed spring 49. The operation shaft 51a being in contact with the valve assembly 50 at the contact section 56 is pressed against the valve housing 20 and the upper side of the inner circumference surface of the guide sleeve 59 provided in the valve housing 20. As a result, the head 58 of the operation shaft 51a abuts on the guide sleeve 59, and the shaft section 53 of the same abuts on the upper block 23. Thus, the position of the operation shaft 51a is fixed.

By rightward motion of the operation shaft 51a in the second direction B2, the contact position of the contact section 56 of the adjusting member 37 is changed from a large-diameter portion of the tapered shaft section 54 to a small-diameter portion of the same. As a result, the valve assembly 50 is moved upward by the spring force of the compressed spring 49, and the valve body 31 is moved to be away from the valve seat 36.

To the contrary, by leftward motion of the operation shaft 51a in the second direction B2, the contact position of the contact section 56 is changed from the small-diameter portion of the tapered shaft section 54 to the large-diameter portion of the same. As a result, the force of the tapered shaft section 54 to press the contact section 56 downward is larger than the spring force of the compressed spring 49, and thus, the valve assembly 50 is moved downward, and the valve body 31 is moved to be close to the valve seat 36.

As described above, the degree of the opening of the valve body 31 is adjusted through the tapered shaft section 54 by the operation (rotation in the present embodiment) of the operation shaft 51a to move the tapered shaft section 54 in the second direction. When the tapered shaft section 54 is moved in its shaft direction to move the adjusting member 37 being in contact with the tapered shaft section 54 in the shaft direction, the valve body 31 can be accurately slightly moved by a taper angle. By the set taper angle, the shaft-direction (up-and-down direction) motion amount of the valve assembly 50 being in contact with the tapered shaft section 54 with respect to the certain shaft-direction (right-and-left direction) motion (such as one rotation) of the tapered shaft section 54 is determined. The smaller the set taper angle of the tapered shaft section 54 is, the smaller the motion amount of the valve assembly 50, that is the valve body 31, is. By this simple configuration, the flow rate of the flow channel can be finely set, and the flow-rate can be accurately regulated.

Figure 9:
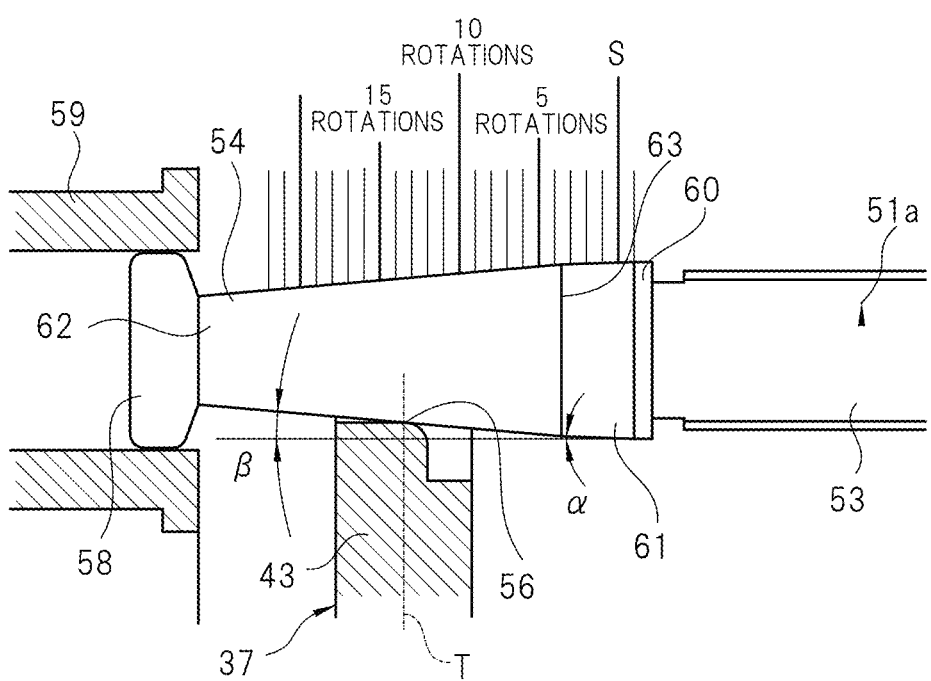
FIG. 9 is an enlarged view illustrating a tapered shaft section of an operation shaft of FIG. 3 to FIG. 8.

The tapered shaft section 54 of the operation shaft 51a includes a first taper section 61 which tilts by a taper angle α to be tapered to shrink from a straight section 60 provided at a boundary between the shaft section 53 and the tapered shaft section 54 toward the head 58 as illustrated in FIG. 9. The tapered shaft section 54 further includes a second taper section 62 which tilts by a taper angle β from the first taper section 61 toward the head 58. A symbol 63 indicates a boundary between the first taper section 61 and the second taper section 62. As described above, the tapered shaft section 54 includes the plurality of taper sections 61 and 62 that are different from each other in the taper angle. If it is assumed that a side of the tapered shaft section 54 close to the straight section 60 is a proximal end or one end while a side of the tapered shaft section 54 close to the head 58 is a distal end or the other end, the taper angle of the taper section 62 closer to the other end than the taper section 61 close to one end is set to be larger.

The tapered shaft section 54 may include three or more taper surfaces formed thereon, with mutually different taper angles, and the taper angles may stepwise increase in an order from one end of the tapered shaft section 54 toward the other end of the same.

For example, the screw pitch of the shaft section 53, that is, the motion distance of the shaft section 53 in its shaft direction per rotation is 0.35 mm, the taper angle α is 2°, and the taper angle β is 5°. When the operation shaft 51a is then rotated to move the tapered shaft section 54 rightward in FIG. 3 while the contact section 56 is in contact with the taper section 61, the valve body 31 moves away from the valve seat 36. At this time, the motion amount of the valve body 31 per rotation of the operation shaft 51a is 0.01 m.

To the contrary, when the operation shaft 51a is rotated to move the tapered shaft section 54 rightward in FIG. 3 while the contact section 56 is in contact with the taper section 61 of the taper angle β, the motion amount of the valve body 31 in the direction of bringing the valve body 31 away from the valve seat 36 per rotation of the operation shaft 51a is 0.03 mm. The motion amount in the shaft direction per rotation of the operation shaft 51a is smaller than the motion amount of 0.05 mm in the shaft direction per rotation of the adjusting knob described in the Patent Document 2 that is the related art. By the use of the operation shaft 51a, the flow rate can be more accurately adjusted than the related art.

FIG. 9 illustrates a state in which a contact position T of the contact section 56 is changed from an initial position S of the taper section 61 to an intermediate position of the taper section 62 by the rotation of the operation shaft 51a.

Figure 4:
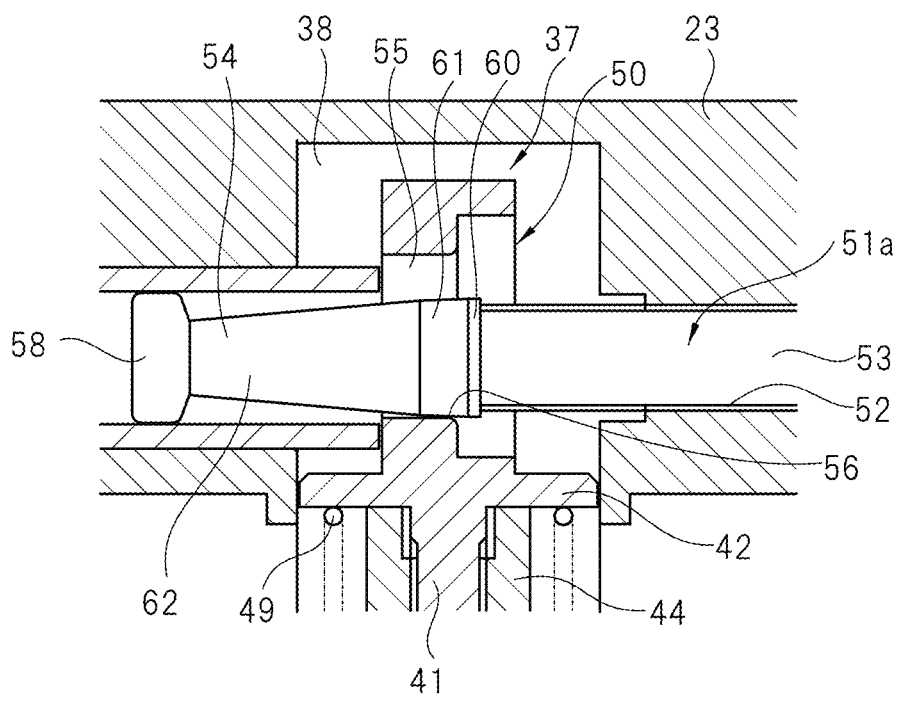
FIG. 4 is an enlarged cross-sectional view illustrating a principal part of FIG. 3.

FIG. 3 and FIG. 4 illustrate a state in which the valve body 31 is in contact with the valve seat 36 and closes the flow channel. At this time, the contact section 56 of the adjusting member 37 is in contact with the taper section 61. However, the valve body 31 may close the flow channel at an initial position where the contact section 56 is in contact with the straight section 60. The operation shaft 51a is pushed upward by the spring 49 through the contact section 56, and therefore, is fixed to an optional position. A locknut 64 may be used if the operation shaft 51a is desirably more stably fixed. When the locknut 64 screwed to the shaft section 53 is fastened on the upper block 23, the valve body 31 more stably keeps the flow channel closed.

Figure 6:
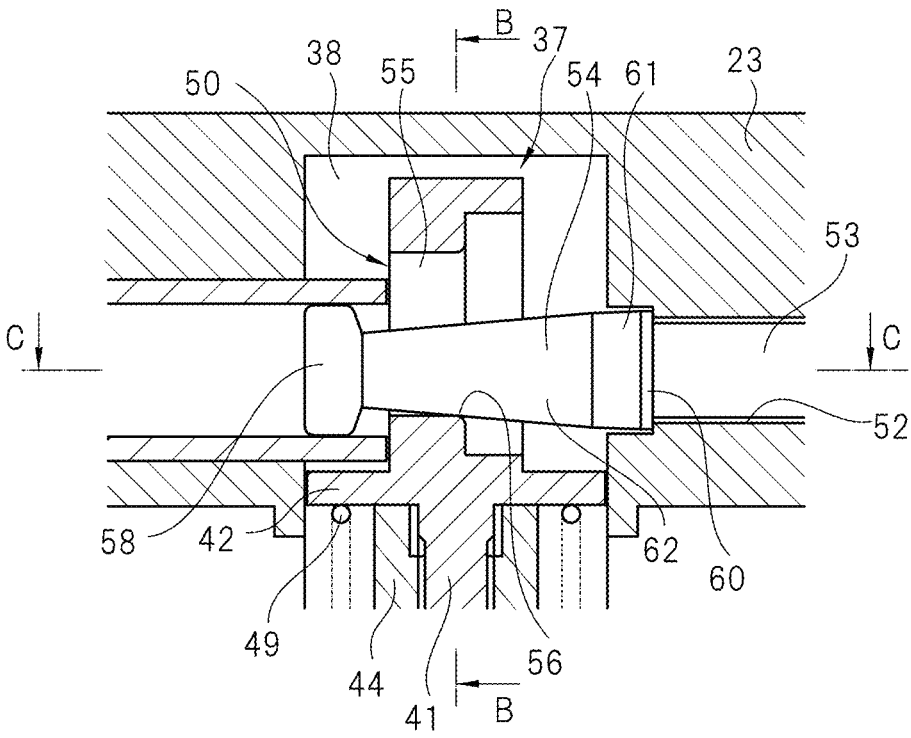
FIG. 6 is an enlarged cross-sectional view illustrating a principal part of FIG. 5.

To the contrary, FIG. 5 and FIG. 6 illustrate a state in which the operation shaft 51a is locked by the locknut 64 after the shaft section 53 is moved to protrude by loosening the locknut 64 to rotate the operation shaft 51a. When the contact section 56 of the adjusting member 37 is brought into contact with the distal end of the tapered shaft section 54, in other words, contact with the smaller-diameter taper section 62, the valve body 31 moves away from the valve seat 36 to open the flow channel. The set degree of the valve opening is kept by the locknut 64. By the change in the position of the tapered shaft section 54 in its shaft direction, the degree of the opening of the valve body 31 can be finely adjusted.

Figure 10:
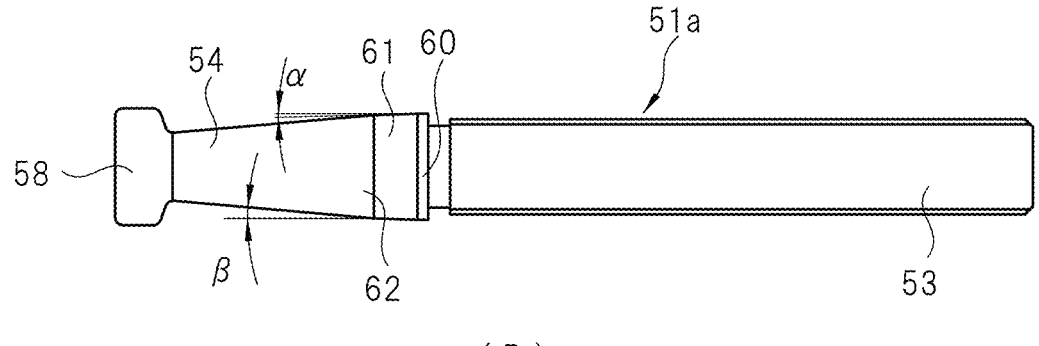
FIG. 10(A) to FIG. 10(C) are front views illustrating operation shafts in three forms.
Figure 10:
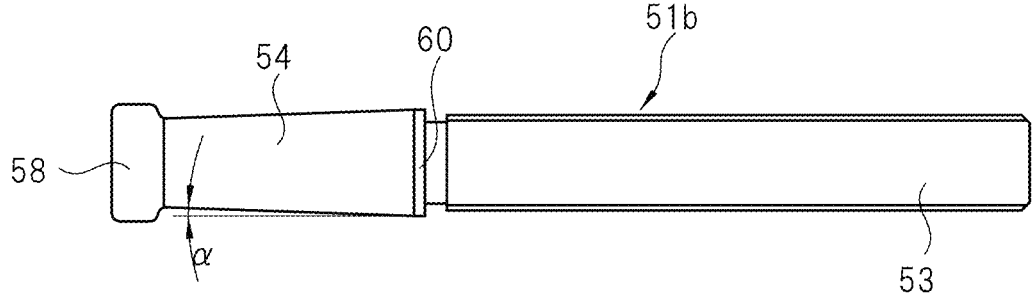
Figure 10:
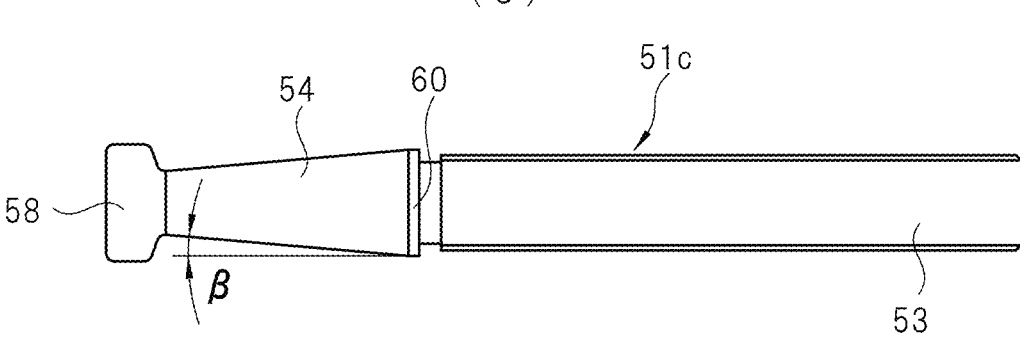

FIG. 10(A) is a front view illustrating an exemplary operation shaft 51a described above, where the tapered shaft section 54 includes the taper section 61 with the taper angle α of 2° and the taper section 62 with the taper angle β of 5°, and has a plurality of taper surfaces formed thereon. To the contrary, in an exemplary operation shaft 51b illustrated in FIG. 10(B), the taper angle α of the entire tapered shaft section 54 is set to 2°. On the other hand, in an exemplary operation shaft 51c illustrated in FIG. 10(C), the taper angle β of the entire tapered shaft section 54 is set to 5°.

As described above, the taper angles and the number of taper surfaces of the tapered shaft section 54 formed thereon are set depending on a required degree of adjustment of the flow rate.

Figure 11:
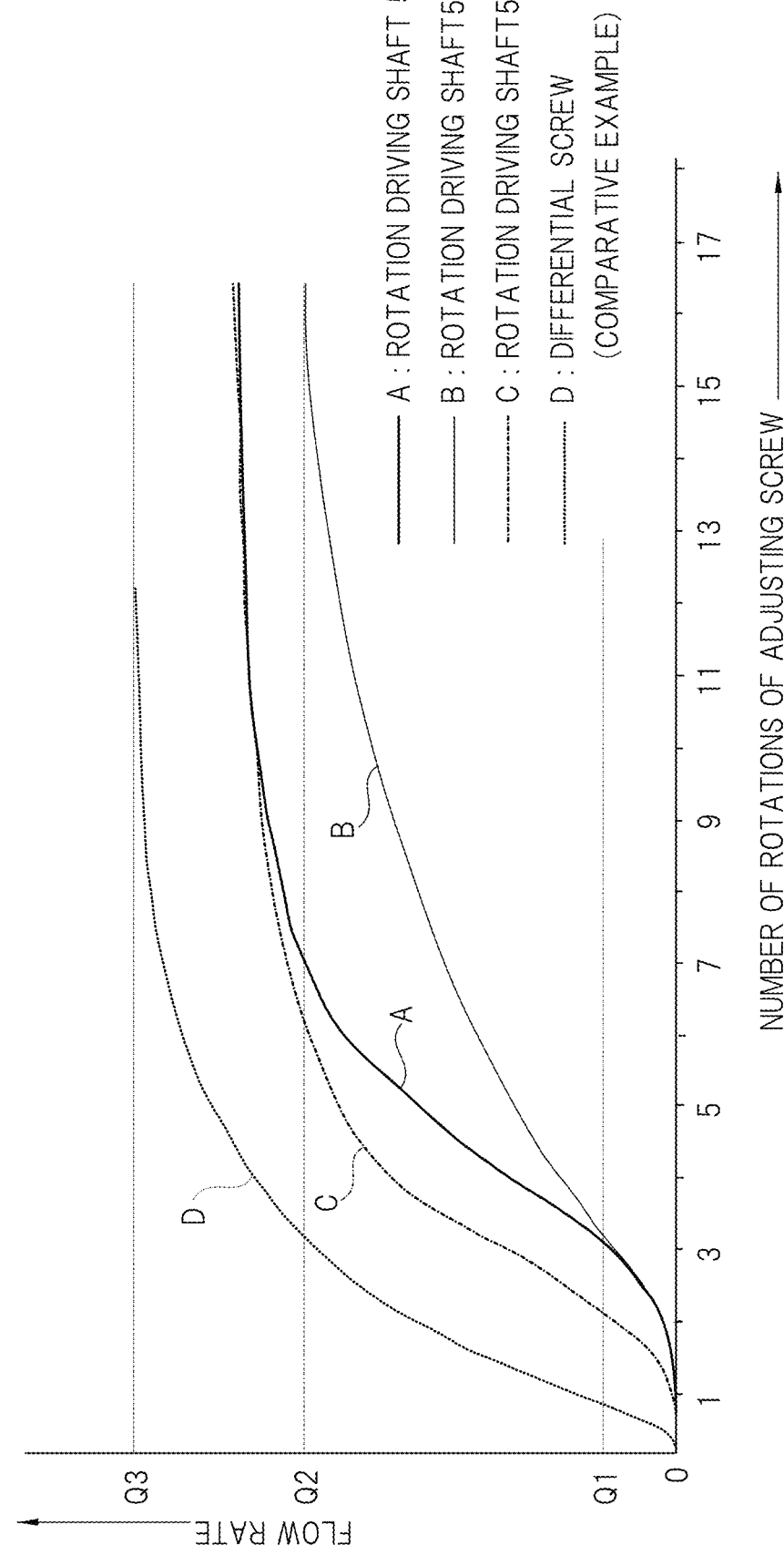
FIG. 11 is a property curve diagram illustrating flow-rate properties of a flow-rate regulator valve.

FIG. 11 is an exemplary property curve diagram illustrating the flow-rate properties of the flow-rate regulator valve depending on the taper angle of the tapered shaft section 54.

A symbol "A" indicates a flow-rate property of a flow-rate regulator valve including the operation shaft 51a of FIG. 9 and FIG. 10(A), a symbol "B" indicates a flow-rate property of a flow-rate regulator valve including the operation shaft 51b of FIG. 10(B), and a symbol "C" indicates a flow-rate property of a flow-rate regulator valve including the operation shaft 51c of FIG. 10(C). As a comparative example, a symbol "D" indicates a flow-rate property of a flow-rate regulator valve using a differential screw as described in the Patent Document 2. The numbers of rotations of an adjusting screw on the horizontal axis indicate the numbers of rotations of the operation shafts 51a to 51c. In the comparative example, the horizontal axis indicates the number of rotations of the adjusting knob, and the shaft-direction motion amount per rotation of the adjusting knob is 0.05 mm. The flow-rate properties A to D are provided in the case of the rotation of the operation shafts 51a to 51c and the adjusting knob in the direction of bringing the valve body 31 away from the valve seat 36 from the state in which the degree of the valve opening is zero because the valve body 31 is in contact with the valve seat 36.

The operation shaft 51b demonstrating the property curve B has a taper angle α of 2°, and the motion amount the valve body 31 per rotation of the operation shaft 51b is 0.01 mm. The operation shaft 51c demonstrating the property curve C has a taper angle β of 5°, and the motion amount the valve body 31 per rotation of the operation shaft 51c is 0.03 mm. The operation shaft 51a demonstrating the property curve A includes the taper section 61 with a taper angle α of 2° and the taper section 62 with a taper angle β of 5°, and its taper angle gradually increases in a direction from one end of the tapered shaft section 54 toward the other end thereof. The property curve A of the operation shaft 51a indicates the same gradient as that of the operation shaft 51b with the taper angle α of 2° until reaching a flow rate Q1, and indicates the same gradient as that of the operation shaft 51c with the taper angle β of 5° when being at the flow rate Q1 or more. That is, the property curve A demonstrates a composite property of the property curve B and the property curve C.

If the flow rate is set from zero to Q1, the property curve D indicates that the flow rate needs to be set by an operation that is one rotation of the adjusting knob or less. To the contrary, each of the property curves A to C indicates that the flow rate can be set by an operation that is about two or three rotations of each of the operation shafts 51a to 51c. That is, the flow rate can be more finely regulated in a range from zero to Q1 by each of the operation shafts 51a to 51c than the differential screw in the comparative example. Further, in comparison among the operation shafts 51a to 51c, the flow rate can be more finely regulated by each of the operation shafts 51a and 51b than the operation shaft 51c.

Further, among the operation shafts 51a to 51c, the operation shaft 51a and the operation shaft 51c are the same in the numbers of rotations for setting the flow rate from Q1 to Q2, and the number of rotations of the operation shaft 51b is larger than those of the other operation shafts. As described above, the operation shaft 51a has the same property as that of the operation shaft 51b until having the certain number of rotations, and has the same property as that of the operation shaft 51c after the certain number of rotations. Thus, the operation shaft 51a is suitable in order to finely regulate the flow rate from zero to the certain value but not need to finely regulate it after the certain value. Additionally, when the maximum flow rate Q3 of the property curve D is needed, the taper angles α and β may be set to appropriate angles. As described above, a plurality of mutually-different taper angles are allowed to be set in the tapered shaft section 54 or an optional taper angle is allowed to be set in the tapered shaft section 54, based on the desired flow-rate regulation.

As described above, in the flow-rate regulator valve including any of the operation shafts 51a to 51c in which the shaft section 53 and the tapered shaft section 54 are in a straight line, the degree of the opening of the valve body 31 can be accurately adjusted by the operation shaft with the remarkably simple configuration. Additionally, the flow-rate properties can be variously set since the taper angle is changed or since the plurality of taper surfaces with the mutually-different angles are provided in the tapered shaft section 54. For example, the change of the flow rate may be set to large at an initial stage of the opening of the valve body, and then, the change of the flow rate may be set to smaller as the valve body approaches the fully opened state.

Second Embodiment

Figure 12:
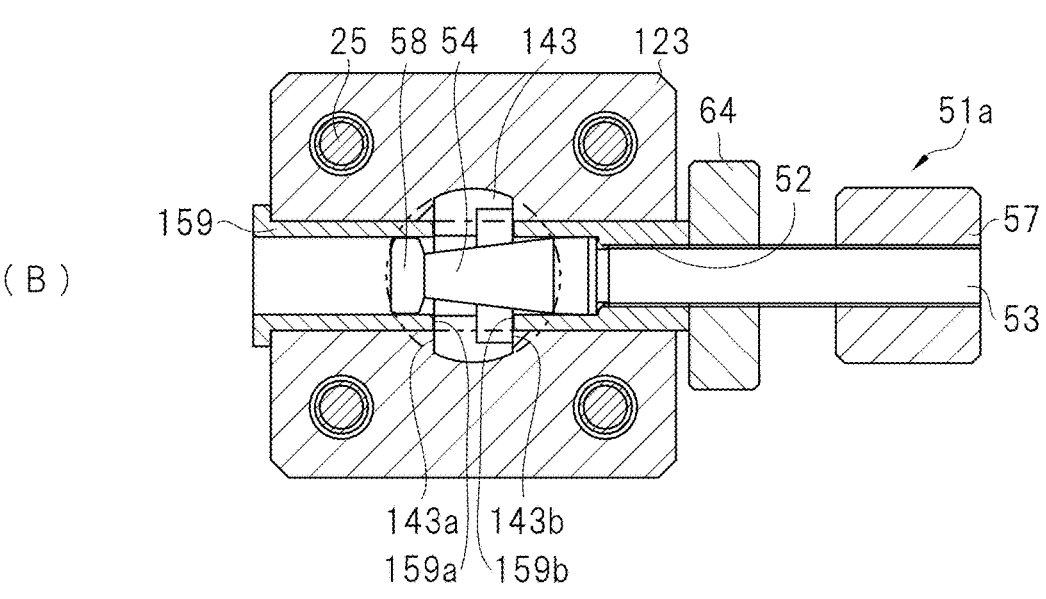
FIG. 12 is diagrams illustrating a flow-rate regulator valve as an exemplary control valve according to a second embodiment.

FIG. 12 is diagrams illustrating a flow-rate regulator valve 116 as an exemplary control valve according to a second embodiment, where FIG. 12(A) is a front cross-sectional view while FIG. 12(B) is a cross-sectional view taken along the line D-D of FIG. 12(A). As illustrated in FIG. 12(A), the following description will be made in assuming that a first direction B1 is the up-and-down direction, a second direction B2 is the right-and-left direction, one side of the first direction B1 is the lower side, the other side of the first direction B1 is the upper side, one side of the second direction is the left side, and the other side of the second direction is the right side.

A control valve according to the second embodiment is also the flow-rate regulator valve 116 configured to regulate the flow rate of the fluid in the flow channel. As similar to the flow-rate regulator valve 16 according to the first embodiment, the flow-rate regulator valve 116 according to the second embodiment has the first feature point (in which the position of the valve body 31 can be adjusted by the motion of the operation shaft 51a including the tapered shaft section 54). To the contrary, the flow-rate regulator valve 116 according to the second embodiment is different from the flow-rate regulator valve 16 according to the first embodiment in that a guide sleeve 159 penetrates through a valve housing 120 in the second direction (referred to as "second feature point" below) and that a length adjusting mechanism for a valve assembly 150 is provided (referred to as "third feature point" below). Note that components specific to the second embodiment will be denoted with reference numerals, the number in its hundred place of which is 1.

The flow-rate regulator valve 116 includes the valve housing 120 made of a plurality of blocks. The valve housing 120 includes the flow channel block 21 arranged on the support plate 24, a valve block 122 attached on the flow channel block 21, and an upper block 123 attached on the valve block 122. Each of the flow channel block 21, the valve block 122, and the upper block 123 is almost cuboid.

As illustrated in FIG. 12(B), the flow channel block 21 and the valve block 122 are fastened between the upper block 123 and the support plate 24 by the plurality of screw members 25. The flow channel block 21 and the valve block 122 are made of, a metal material, or a resin material such as POM or PPS, and the upper block 123 and the support plate 24 are made of a metal material. As described above, a reason why the valve housing 120 is made of the separable blocks is to mount the valve assembly 150 into the valve housing 120.

Returning to FIG. 12(A), the flow channel block 21 is provided with the first joint 26 with the inflow/outflow port 26a and the second joint 27 with the inflow/outflow port 27a to form the inflow channel 28a communicating with the inflow/outflow port 26a and the outflow channel 28b communicating with the inflow/outflow port 27a. Pipes not illustrated are mounted on the joints 26 and 27, and are fixed to the joints 26 and 27 by the union nuts 29, respectively. The flow channel block 21 has the same configuration and function as those of the flow-rate regulator valve 16 according to the first embodiment.

The valve body 31 is embedded in the flow channel block 21. The valve body 31 is a diaphragm valve including the shaft 32 at its center in the radial direction, the annular section 33 arranged in the flow channel block 21 and sandwiched between the flow channel block 21 and the valve block 122, and the elastic deformation section 34 between the annular section 33 and the shaft 32, and is made of fluororesin. The communicating unit 35 configured to communicate the inflow channel 28a and the outflow channel 28b is formed between the valve body 31 and the flow channel block 21. The valve body 31 is movable to be close to and away from the valve seat 36 (in other words, movable in the first direction B1), and changes the degree of the communication opening of the flow channel made of the inflow channel 28a and the outflow channel 28b, in other words, changes the degree of the opening of the valve body 31. The valve body 31 also has the same configuration and function as those of the flow-rate regulator valve 16 according to the first embodiment.

The guide sleeve 159 is fixed into the upper block 123. The guide sleeve 159 penetrates through the upper block 123 (that is, the valve housing 120) in the second direction B2. The guide sleeve 159 is hollow, and the hollow section is an insertion hole 152. The other side of the inner circumference of the insertion hole 152 in the second direction B2A includes a female screw formed thereon. A lower portion of the guide sleeve 159 is provided with a cutout, one side of which in the second direction B2 includes a first cutout surface 159a formed thereon while the other side of which in the second direction B2 includes a second cutout surface 159b formed thereon. This cutout is fit in a head 143 of a first adjusting member 137 described later.

The operation shaft 51a is inserted into the insertion hole 152. The operation shaft 51a includes the shaft section 53, the straight section 60, the tapered shaft section 54, and the head 58 in this order from the other side toward the one side in the second direction B2. The outer circumference of the shaft section 53 includes a male screw formed thereon. The other side of the shaft section 53 in the second direction B2 is provided with the operation section 57. The one side (the male screw) of the shaft section 53 in the second direction B2 is screwed to the female screw of the insertion hole 152. The locknut 64 is screwed between the guide sleeve 159 and the operation section 57 in the shaft section 53. The tapered shaft section 54 includes a taper section formed thereon, a diameter of which decreases from the other side toward the one side in the second direction B2. The head 58 and the straight section 60 are guided by the guide sleeve 159. The operation shaft 51a has the same configuration and function as those of the flow-rate regulator valve 16 according to the first embodiment.

The valve assembly 150 provided with the valve body 31 is mounted on the valve housing 120 to be movable in the first direction B1. The valve assembly 150 is housed in the valve block 122. The valve assembly 150 includes the first adjusting member 137, a second adjusting member 170, and a coupling sleeve 144. The first adjusting member 137, the second adjusting member 170, and the coupling sleeve 144 are arranged in coaxial with the shaft 32 of the valve body 31 in this order from the other side toward the one side in the first direction B1.

The first adjusting member 137 includes a shaft 141, a flange 142, and a head 143 in this order from the one side toward the other side in the first direction B1. The outer circumference of the shaft 141 includes a male screw formed thereon. The head 143 is provided with the contact section 56 being in contact with the tapered shaft section 54. Further, one side of the head 143 in the second direction B2 includes a first abutting surface 143a formed thereon, and the other side thereof includes a second abutting surface 143b formed thereon. As illustrated in also FIG. 12(B), the first abutting surface 143a abuts on the first cutout surface 159a while the second abutting surface 143b abuts on the second cutout surface 159b to prevent the rotation of the first adjusting member 137.

The tapered shaft section 54 is in contact with the contact section 56, and thus, force is applied to the first adjusting member 137 to move in a direction (the second direction B2) in which the tapered shaft section 54 travels. However, the motion of the first adjusting member 137 in the second direction B2 is limited by the first abutting surface 143a and the second abutting surface 143b. Thus, the motion of the valve assembly 150 in the second direction B2 is also limited, and the flow-rate property is improved. That is, the motion of the valve assembly 150 in the second direction B2 makes the position of the valve body 31 unstable, and thus, makes the accuracy of the flow-rate regulation unstable. Since the first adjusting member 137 is provided with the first abutting surface 143a and the second abutting surface 143b, the position of the valve body 31 is made stable, and the flow-rate property is improved.

Figure 14:
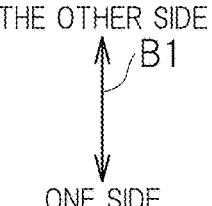
FIG. 14 is an enlarged view illustrating a length adjusting mechanism for the flow-rate regulator valve.

As illustrated in FIG. 14, the other side of the second adjusting member 170 in the first direction B1 includes a large-diameter section 170a, one side thereof includes a small-diameter section 170b, and a center thereof includes a hollow section 170c. Linear knurling pattern 170d is formed on the other circumference of the larger-diameter section 170a. The inner circumference of the hollow section 170c includes a female screw formed thereon. The male screw formed on the shaft 141 is screwed together with the female screw formed on the hollow section 170c to screw the first adjusting member 137 to the second adjusting member 170.

Figure 13:
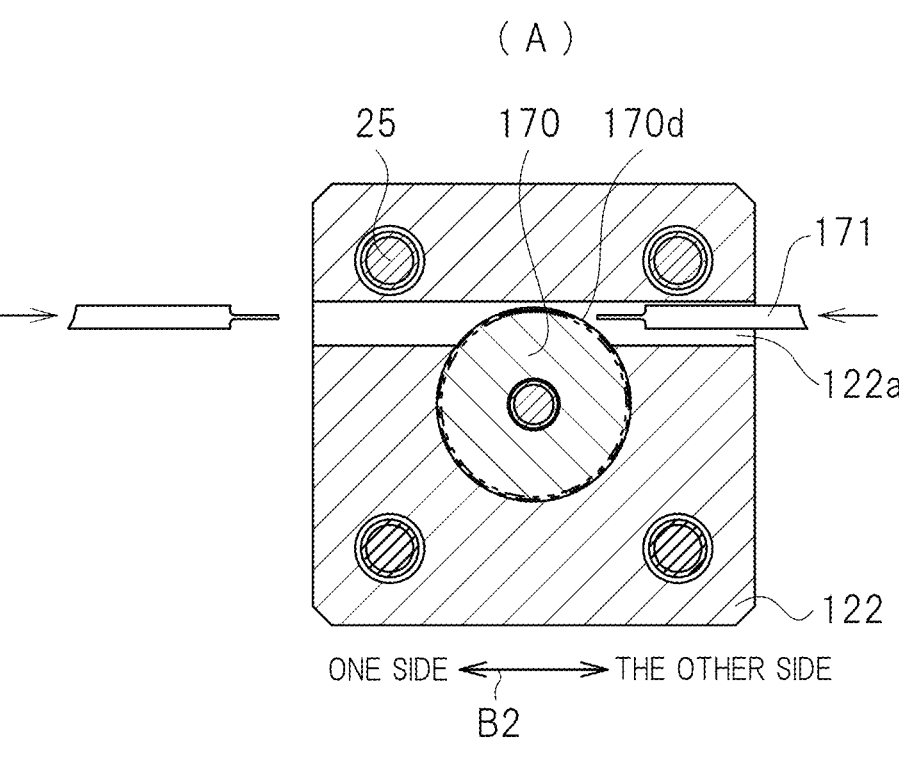
FIG. 13 is a cross-sectional view taken along the line E-E of FIG. 12(A).
Figure 13:
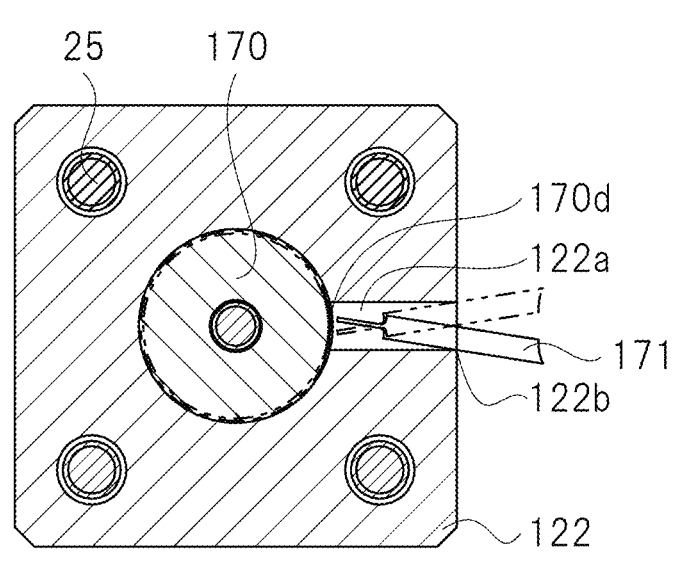

The valve block 122A includes a communicating hole 122a communicating with the second adjusting member 170, formed thereon as illustrated in FIG. 13. The communicating hole 122a may communicate with the second adjusting member 170 from both the one side and the other side in the second direction B2 as illustrated in FIG. 13(A), or may communicate with the second adjusting member 170 from only either the one side or the other side (the other side in FIG. 13(B)) in the second direction B2 as illustrated in FIG. 13(B).

In the case of FIG. 13(A), the second adjusting member 170 is rotated rightward when a pin 171 inserted through the communicating hole 122a on the one side is abutted on and is pressed against the linear knurling pattern 170d, and the second adjusting member 170 is rotated leftward when the pin 171 inserted through the communicating hole 122a on the other side is abutted on and is pressed against the linear knurling pattern 170d.

In the case of FIG. 13(B), the second adjusting member 170 is rotated rightward or leftward when the pin 171 inserted through the communicating hole 122a is abutted on the linear knurling pattern 170d and is operated while taking a boundary section 122b with the valve block 122 as a fulcrum point.

That is, the second adjusting member 170 is operated through the communicating hole 122a.

Returning to FIG. 12(A), the coupling sleeve 144 is a member configured to couple the valve body 31 and the second adjusting member 170. The coupling sleeve 144 and the valve body 31 are coupled to each other when the shaft 32 is screwed to the one side of the coupling sleeve 144 in the first direction B1. The coupling sleeve 144 and the second adjusting member 170 are coupled to each other when the small-diameter section 170b is inserted into the other side of the coupling sleeve 144 in the first direction B1. As a result, the first adjusting member 137 is coupled with the valve body 31 through the second adjusting member 170 and the coupling sleeve 144.

The compressed spring 49 interposes between the coupling sleeve 144 and the valve block 122. One end of the coupling sleeve 144 is provided with a flange, and one end of the compressed spring 49 abuts on the flange of the coupling sleeve 144 while the other end thereof abuts on the step 47. The compressed spring 49 applies bias force to the other side (upper side) of the valve assembly 150 (that is, the valve body 31, the coupling sleeve 144, the second adjusting member 170, and the first adjusting member 137) in the first direction B1.

The first feature point (in which the position of the valve body 31 can be adjusted by the motion of the operation shaft 51a including the tapered shaft section 54) will be described with reference to FIG. 12(A). By the operator's operation on the operation section 57, the operation shaft 51a is rotated, and is moved in the second direction B2 relative to the upper block 123. Then, the contact position between the tapered shaft section 54 of the operation shaft 51a and the contact section 56 of the first adjusting member 137 changes to move the valve assembly 150 in the first direction B1 relative to the valve block 122, and to adjust the position of the valve body 31 in the first direction B1.

Specifically, when the operation shaft 51a moves toward the other side (rightward) in the second direction B2 to change the contact position of the contact section 56 from the larger-diameter portion of the tapered shaft section 54 to the smaller-diameter portion thereof, the valve assembly 150 is moved toward the other side (upward) in the first direction B1 by the bias force of the compressed spring 49, and the valve body 31 moves away from the valve seat 36. To the contrary, when the operation shaft 51a moves toward the one side (leftward) in the second direction B2 to change the contact position of the contact section 56 from the smaller-diameter portion of the tapered shaft section 54 to the larger-diameter portion thereof, the valve assembly 150 moves toward the one side (downward) in the first direction B1 to be against the bias force of the compressed spring 49, and the valve body 31 approaches the valve seat 36. The first feature point has the same function as that of the flow-rate regulator valve 16 according to the first embodiment.

Next, the second feature point (in which the guide sleeve 159 penetrates through the valve housing 120 in the second direction B2) will be described. The valve assembly 150 is pushed toward the other side (upward) in the first direction B1 by the bias force of the compressed spring 49. Thus, the operation shaft 51*a*, which is in contact with the valve assembly 150 at the contact section 56, is pressed against the upper side of the inner circumference of the guide sleeve 159 penetrating through the valve housing 120 in the second direction B2. As a result, the operation shaft 51*a* abuts on the inner circumference of the guide sleeve 159 at two portions that are the head 58 and the straight section 60. Therefore, fluctuation in operating the operation shaft 51*a* can be reduced, and the position of the operation shaft 51*a* is fixed.

The head 58 and the shaft section 53 in the operation shaft 51*a* according to the first embodiment abut on different members (that are the guide sleeve 59 and the upper block 23), respectively. To the contrary, in the second embodiment, the operation shaft 51*a* abuts on the guide sleeve 159 at the two portions, and thus, the position of the operation shaft 51*a* is made further stable. Additionally, since the through-hole 55 of the adjusting member 37 and the enclosure hole 38 of the upper block 23 as described in the flow-rate regulator valve 16 according to the first embodiment (see FIG. 3) do not need to be provided, the flow-rate regulator valve 116 can be downsized.

Next, the third feature point (in which the length adjusting mechanism for the valve assembly 150 is provided) will be described. As illustrated in FIG. 14, the first adjusting member 137 is not rotatable, the second adjusting member 170 is rotatable, and the coupling sleeve 144 is not rotatable. By the rotation of the second adjusting member 170 in this state, a gap "d" between the first adjusting member 137 and the second adjusting member 170 is changed to adjust the length of the valve assembly 150 in the first direction B1.

For example, when the second adjusting member 170 is rotated rightward to an arrow direction "R", the shaft 141 of the first adjusting member 137 is screwed into the hollow section 170*c* of the second adjusting member 170 to decrease the gap d. As a result, the coupling sleeve 144 is moved toward the other side (upward) in the first direction B1 by the bias force of the compressed spring 49, the valve body 31 is also moved toward the other side (upward) in the first direction B1, and thus, the length of the valve assembly 150 in the first direction B1 decreases.

To the contrary, when the second adjusting member 170 is rotated leftward to an arrow direction "L", the gap d increases. As a result, the coupling sleeve 144 is moved toward the one side (downward) in the first direction B1 to be against the bias force of the compressed spring 49, the valve body 31 is also moved toward the one side (downward) in the first direction B1, and thus, the length of the valve assembly 150 in the first direction B1 increases.

From the above, the significance of the adjustment of the length of the valve assembly 150 in the first direction B1 is as follows. That is, since the valve body 31 is made of resin and has an individual dimension error, there may occur a problem that the valve body 31 cannot be fully closed even if the operation shaft 51*a* is moved toward the one side in the second direction B2 or a problem that the valve body 31 is excessively pressed against the valve seat 36 and is broken by the motion of the operation shaft 51*a* toward the one side in the second direction B2. The flow-rate regulator valve may regulate the flow rate from the flow rate at the fully closed position (zero-point position) to "X" cc, and thus, the flow-rate can be correctly regulated only at the fully closed position. In order to solve the problems, the flow-rate regulator valve needs to be checked before shipment, and then, the length of the valve assembly 150 needs to be adjusted depending on the check result.

However, the check can be made only after the flow-rate regulator valve is assembled. If any problem is found by the check, the length of the valve assembly 150 needs to be adjusted after disassembling the assembled flow-rate regulator valve, and thus, a lot of time and effort are needed. To the contrary, according to the third feature point, the length of the valve assembly 150 in the first direction B1 can be easily adjusted by rotating the second adjusting member 170 through the communicating hole 122*a* in the outside of the flow-rate regulator valve 116. That is, the length of the valve assembly 150 can be adjusted even after the flow-rate regulator valve 116 is assembled.

Note that the length adjustment of the valve assembly 150 is performed at the time of shipment while using the third feature point by a manufacturer of the flow-rate regulator valve 116, and is different from the position adjustment of the valve body 31 performed when used by a user of the flow-rate regulator valve 116 while using the first feature point.

Third Embodiment

Figure 15:
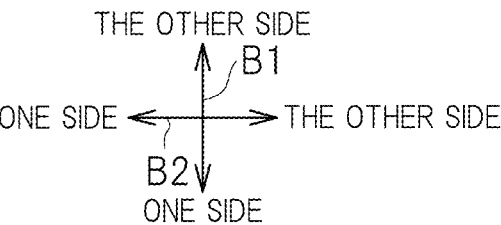
FIG. 15 is a front cross-sectional view illustrating an opening/closing valve as an exemplary control valve according to a third embodiment.

FIG. 15 is a front cross-sectional view illustrating an opening/closing valve 215 as an exemplary control valve according to a third embodiment. A control valve according to the third embodiment is the opening/closing valve 215 configured to open/close the flow channel by reciprocation between the fully closed position where the valve body 31 is in contact with the valve seat 36 and the fully opened position where the valve body 31 is away from the valve seat 36.

As similar to the flow-rate regulator valve 116 according to the second embodiment, the opening/closing valve 215 according to the third embodiment has the first feature point (in which the fully opened position of the valve body 31 can be adjusted by the motion of the operation shaft 51*a* including the tapered shaft section 54), the second feature point (in which a guide sleeve 259 penetrates through a valve housing 220 in the second direction B2), and the third feature point (in which a length adjusting mechanism for a valve assembly 250 is provided). To the contrary, the opening/closing valve 215 according to the third embodiment is different from the flow-rate regulator valve 116 according to the second embodiment in that the opening/closing valve 215 includes a backlash-dependent fluctuation preventing mechanism of the operation shaft 51*a* (referred to as "fourth feature point" below). Note that components specific to the third embodiment will be denoted with reference numerals, the number in its hundred place of which is 2.

The opening/closing valve 215 includes the valve housing 220 made of a plurality of blocks. The valve housing 220 includes the flow channel block 21 arranged on the support plate 24, and a valve block 222 attached on the flow channel block 21. In the third embodiment, the functions of the upper block 23 according to the first embodiment and the upper block 123 according to the second embodiment are embedded in the valve block 222.

The first joint 26, the inflow/outflow port 26*a*, the second joint 27, the inflow/outflow port 27*a*, the inflow channel 28*a*, the outflow channel 28*b*, and the union nut 29 in the flow channel block 21 have the same configurations and functions as those of the first embodiment and the second embodiment. Further, the shaft 32, the annular section 33, and the elastic deformation section 34 in the valve body 31 (diaphragm valve), the communicating unit 35, and the valve seat 36 also have the same configurations and functions as those of the first embodiment and the second embodiment. However, the annular section 33 is sandwiched between the flow channel block 21 and a sealing member 295 attached to the valve block 222.

The guide sleeve 259 is fixed into the upper side of the valve block 222. The guide sleeve 259 penetrates through the valve block 222 (that is, the valve housing 220) in the second direction B2. The guide sleeve 259 is hollow, and the hollow section is an insertion hole 252. The other side of the inner circumference of the guide sleeve 259 in the second direction B2 includes a female screw formed thereon. A lower portion of the guide sleeve 259 is provided with a cutout. This cutout is fit the first adjusting member 137. By this fitting, the rotation of the first adjusting member 137 is prevented, and the motion of the first adjusting member 137 in the second direction B2 is prevented, as similar to the description in the second embodiment.

The operation shaft 51a is inserted into the insertion hole 252. The operation section 57, the shaft section 53, the straight section 60, the tapered shaft section 54, and the head 58 in the operation shaft 51a have the same configurations and functions as those of the first embodiment and the second embodiment.

The locknut 64 is arranged between the guide sleeve 259 and the operation section 57 in the shaft section 53. The locknut 64 is a member configured to fix the position of the operation shaft 51a, and includes a screw 64a screwed to the shaft section 53 and a fastening surface 64b pressing an other-side end surface of the guide sleeve 259 in the second direction B2 toward the one side in the second direction B2 by the screwing.

The other side of the guide sleeve 259 in the second direction B2 includes a step 259a formed thereon. The step 259a houses the backlash-dependent fluctuation preventing mechanism of the operation shaft 51a, the mechanism being made of a flange nut 265 and a spring member. The spring member is a third compressed spring 266. The flange nut 265 includes a tube 265a screwed to the shaft section 53 and a flange 265b pressed toward the other side in the second direction B2 by the biasing of the third compressed spring 266.

The valve assembly 250 provided with the valve body 31 is mounted on the valve housing 220 to be movable in the first direction B1. The valve assembly 250 is housed in the hollow section of the valve block 222. The other side of the inner circumference of the valve block 222 in the first direction B1 includes a first step 222a formed thereon, and the one side thereof includes a second step 222b formed thereon. Further, the valve block 222 includes a supply/discharge port 222c configured to communicate from the outside to the inside, formed thereon.

The valve assembly 250 includes the first adjusting member 137, a second adjusting member 270, and a piston 290. The first adjusting member 137, the second adjusting member 270, and the piston 290 are arranged in coaxial with the shaft 32 of the valve body 31 in this order from the other side toward the one side in the first direction B1. The first adjusting member 137 has the same configuration and function as those of the second embodiment.

Figure 16:
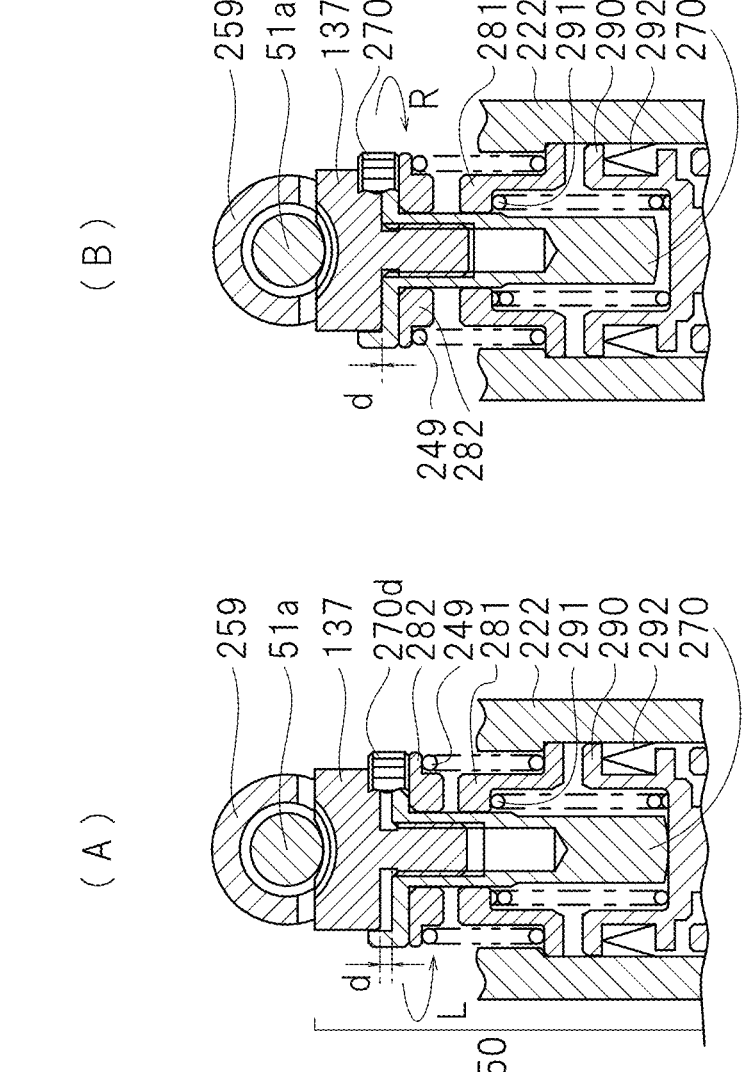
FIG. 16 is an enlarged view illustrating a length adjusting mechanism for the opening/closing valve.

A center of the second adjusting member 270 includes a hollow section 270c. The inner circumference of the hollow section 270c includes a female screw formed thereon. The first adjusting member 137 is screwed to the second adjusting member 270 when the male screw formed on the shaft 141 of the first adjusting member 137 is screwed to the female screw formed on the hollow section 270c. Linear knurling pattern 270d is formed on the outer circumference of the second adjusting member 270 as illustrated in FIG. 16. Though not illustrated, the valve block 222 includes a communicating hole communicating with the second adjusting member 270, formed thereon, and the second adjusting member 270 is rotated when a pin inserted through the communicating hole is abutted on and pressed against the linear knurling pattern 270d.

Returning to FIG. 15, the piston 290 is housed in a cylinder unit 299 formed in the valve block 222 to be reciprocable in the first direction B1 (up-and-down direction). The cylinder unit 299 is partitioned into a spring unit 299a and a pressure unit 299b by the piston 290.

A second compressed spring 291 as a spring member is embedded in the spring unit 299a. The second compressed spring 291 applies spring force to the valve body 31 through the piston 290 toward the one side (downside) in the first direction B1. A packing 292 seals between the spring unit 299a and the pressure unit 299b.

The sealing member 295 is arranged on the one side (lower side) of the hollow section of the valve block 222 in the first direction B1. The sealing member 295 abuts on the second step 222b of the valve block 222. An O-ring 298 seals between the valve block 222 and the sealing member 295.

The valve block 222 includes the supply/discharge port 222c communicating with the pressure unit 299b, formed thereon. The piston 290 is reciprocated in the cylinder unit 299 in the first direction B1 by the fluid supplied/discharged from the supply/discharge port 222c. The valve block 222 includes an actuator made of the cylinder unit 299, the piston 290, the second compressed spring 291, and the like, formed thereon.

A first washer 281 and a second washer 282 are arranged between the second adjusting member 270 and the piston 290. The first washer 281 abuts on a large-diameter section of the second adjusting member 270. The second washer 282 abuts on the first step 222a of the valve block 222.

A first compressed spring 249 as a spring member interposes between the first washer 281 and the second washer 282. Spring force of the second compressed spring 291 is stronger than spring force of the first compressed spring 249. Thus, the first compressed spring 249 applies bias force to the first washer 281 and the second adjusting member 270 screwed to the first adjusting member 137 toward the other side (upward) in the first direction B1.

The assembly of the valve assembly 250 in the valve block 222 will be described herein. The components of the valve assembly 250 are assembled in the valve block 222 when being inserted into the hollow section of the valve block 222 with the guide sleeve 259 fixed, sequentially from the one side toward the other side in the first direction B1. Specifically, the valve assembly 250 is assembled by the insertion of the second adjusting member 270 screwed to the first adjusting member 137, the first washer 281, the first compressed spring 249, the second washer 282, the second compressed spring 291, the piston 290 attached with the packing 292, and the sealing member 295 attached with a packing 297 and the O-ring 298 into the hollow section of the valve block 222, and by the screwing of the shaft 32 of the valve body 31 to the piston 290.

Next, operations of the piston 290 and the valve body 31 will be described. As illustrated in FIG. 15, a gap "D" is set between the lower end of the second adjusting member 270 and its facing end surface of the piston 290 by the motion (rotation) of the operation shaft 51*a*. The gap D is a stroke at which the piston 290 reciprocates in the first direction B1. The second adjusting member 270 limits a motion amount of the piston 290 toward the other side in the first direction.

When the fluid (such as compressed air) is supplied from the supply/discharge port 222*c* into the pressure unit 299*b*, the piston 290 is moved by the gap D toward the other side (upward) in the first direction B1 by the pressure of the fluid to be against the bias force of the second compressed spring 291. When the valve body 31 then moves away from the valve seat 36 so that the piston 290 is in contact with the second adjusting member 270, the motion of the piston 290 is limited by the second adjusting member 270, and the valve body 31 is positioned at the fully opened position. As a result, the liquid L flows from the flow channel 28*a* to the flow channel 28*b* through the communicating unit 35.

To the contrary, when the fluid in the pressure unit 299*b* is discharged from the supply/discharge port 222*c*, the piston 290 moves by the gap D toward the one side (downward) in the first direction B1 due to the bias force of the second compressed spring 291. Then, the valve body 31 abuts on the valve seat 36, the piston 290 moves away from the second adjusting member 270, and the valve body 31 is positioned at the fully closed position. As a result, the communication between the flow channel 28*a* and the flow channel 28*b* is shut off, and the liquid L does not flow.

The first to fourth feature points will be described herein. At first, the first feature point (in which the fully opened position of the valve body 31 can be adjusted by the motion of the operation shaft 51*a* including the tapered shaft section 54) is to adjust the gap D between the second adjusting member 270 and the piston 290, in other words, the stroke of the actuator. By the operator's operation on the operation section 57, the operation shaft 51*a* is rotated and is moved in the second direction B2 relative to the valve block 222. As a result, the contact position between the tapered shaft section 54 of the operation shaft 51*a* and the first adjusting member 137 changes to move the first adjusting member 137 and the second adjusting member 270 in the first direction B1 relative to the valve block 222, and to adjust the gap D.

Specifically, when the operation shaft 51*a* moves toward the other side (rightward) in the second direction B2 to change the contact position of the first adjusting member 137 from the larger-diameter portion of the tapered shaft section 54 to the smaller-diameter portion thereof, the first adjusting member 137 and the second adjusting member 270 are moved toward the other side (upward) in the first direction B1 by the bias force of the first compressed spring 249 to increase the gap D. FIG. 15 illustrates a state of the largest gap D. To the contrary, when the operation shaft 51*a* moves toward the one side (leftward) in the second direction B2 to change the contact position of the first adjusting member 137 from the smaller-diameter portion of the tapered shaft section 54 to the larger-diameter portion thereof, the first adjusting member 137 and the second adjusting member 270 are moved toward the one side (downward) in the first direction B1 to be against the bias force of the first compressed spring 249 to decrease the gap D. As described above, when the gap D, that is the stroke of the actuator, is adjusted by the operation shaft 51*a*, the fully opened position of the valve body 31 is set.

Next, the second feature point (in which the guide sleeve 259 penetrates through the valve housing 220 in the second direction B2) will be described. The first adjusting member 137 and the second adjusting member 270 are pushed toward the other side (upward) in the first direction B1 by the bias force of the first compressed spring 249. Thus, the operation shaft 51*a* being in contact with the first adjusting member 137 is pressed against the upper side of the inner circumference of the guide sleeve 259 penetrating through the valve housing 220 in the second direction B2. As a result, the operation shaft 51*a* abuts on the inner circumference of the guide sleeve 259 at two portions that are the head 58 and the straight section 60. Therefore, fluctuation in operating the operation shaft 51*a* can be reduced, and the position of the operation shaft 51*a* is fixed.

The opening/closing valve 215 includes the actuator, and thus, a shock toward the other side (upward) in the first direction B1 is applied to the first adjusting member 137 by the reciprocation of the piston 290. Both the head 58 and the straight section 60 of the operation shaft 51*a* abut on the two portions of the inner circumference of the guide sleeve 259, respectively, and thus, the position of the operation shaft 51*a* is difficult to change even when receiving the shock. Further, the through-hole 55 of the adjusting member 37 and the enclosure hole 38 of the upper block 23 as described in the flow-rate regulator valve 16 according to the first embodiment (see FIG. 3) do not need to be provided, and thus, the opening/closing valve 215 can be downsized. The second feature point has the same function as that of the second embodiment.

Next, the fourth feature point (which is the backlash-dependent fluctuation preventing mechanism of the operation shaft 51*a*) will be described. In the flow-rate regulator valve 16 according to the first embodiment and the flow-rate regulator valve 116 according to the second embodiment, after the operation shaft 51*a* is rotated, the locknut 64 is fastened to fix the position of the operation shaft 51*a*. However, there is the failure which is the backlash-dependent fluctuation of the operation shaft 51*a*. According to the fourth feature point, the flange nut 265 and the third compressed spring 266 are housed in the step formed in the guide sleeve 259, and thus the direction of force for fixing the operation shaft 51*a* by the locknut 64 (the direction of force toward the one side in the second direction B2) is opposite to the direction of force caused by the third compressed spring 266 (the direction of force toward the other side in the second direction B2) to prevent the fluctuation of the operation shaft 51*a*.

Next, the third feature point (which is the length adjusting mechanism for the valve assembly 250) will be described. The third feature point is to adjust the gap "d" between the first adjusting member 137 and the second adjusting member 270. The first adjusting member 137 is not rotatable, the second adjusting member 270 is rotatable, and the first washer 281 and the second washer 282 are not rotatable. By rotation of the second adjusting member 270 in this state, the gap d between the first adjusting member 137 and the second adjusting member 270 is changed to adjust the length of the valve assembly 250 in the first direction B1. Additionally, even by the rotation of the second adjusting member 270, the first washer 281 abutting on the second adjusting member 270 is not rotated, and thus, the first compressed spring 249 biasing the first washer 281 is not twisted.

The gap d is adjusted while the larger-diameter portion of the tapered shaft section 54 of the operation shaft 51*a* is in contact with the first adjusting member 137, in other words, while the second adjusting member 270 is in contact with the piston 290.

As illustrated in FIG. 16(B), by the rightward rotation of the second adjusting member 270 in an arrow direction "R", the gap d is decreased, a gap is formed between the second adjusting member 270 and the piston 290, and thus, a pressing pressure on the valve body 31 is weakened. The adjustment is made when the pressing pressure on the valve body 31 is strong.

To the contrary, as illustrated in FIG. 16(A), by the leftward rotation of the second adjusting member 270 in an arrow direction "L", the gap d is increased because the second adjusting member 270 is moved downward, the pressing pressure onto the piston 290 caused by the second adjusting member 270 is strengthened, and thus, the pressing pressure on the valve body 31 is also strengthened. The adjustment is made when the pressing pressure on the valve body 31 is weak.

Fourth Embodiment

Figure 17:
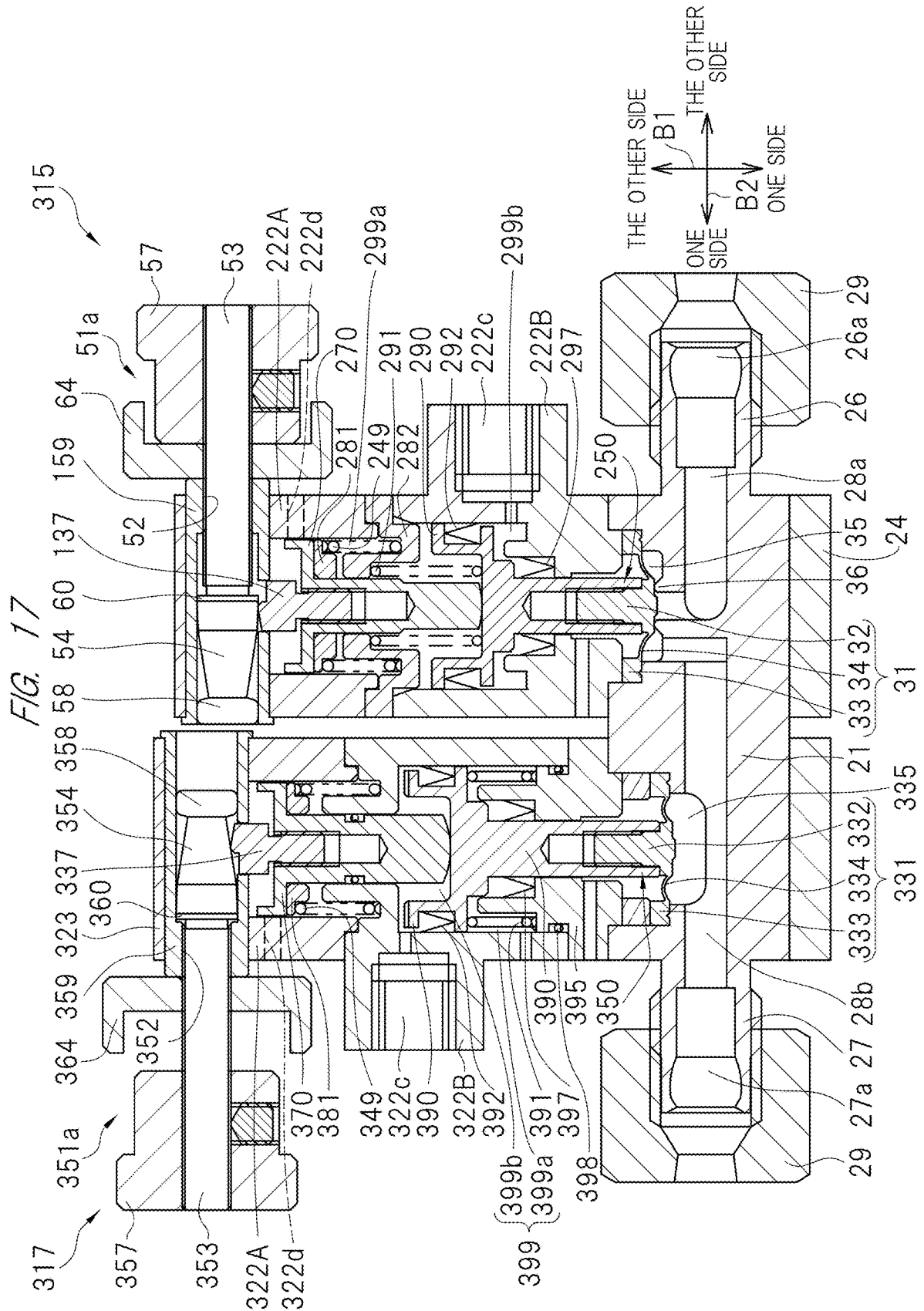
FIG. 17 is a front cross-sectional view illustrating a suck-back valve and an opening/closing valve as exemplary control valve according to a fourth embodiment.

FIG. 17 is a front cross-sectional view illustrating a suck-back valve 317 and an opening/closing valve 315 as an exemplary control valve according to a fourth embodiment. A control valve according to the fourth embodiment is a unit valve of a unified body made of the opening/closing valve 315 configured to open/close the flow channel by the recip-rocation of the valve body 31 between the fully closed position where the valve body 31 is in contact with the valve seat 36 and the fully opened position where the valve body 31 is away from the valve seat 36 and the suck-back valve 317 configured to prevent dropping of the liquid L from the application nozzle 12 (see FIG. 1).

Specifically, the suck-back valve 317 and the opening/closing valve 315 include the common flow channel block 21, and the one side of the flow channel block 21 in the second direction is provided with the suck-back valve 317 while the other side thereof is provided with the opening/closing valve 315. The flow channel block 21 according to the fourth embodiment has the same function as those of the flow channel blocks 21 according to the first to third embodiments except that a suck-back chamber 335 is formed in the flow channel 28b.

The opening/closing valve 315 according to the fourth embodiment has the same function as that of the opening/closing valve 215 according to the third embodiment except that the fourth feature point (which is the backlash-dependent fluctuation preventing mechanism of the operation shaft 51a) is not provided. That is, the opening/closing valve 315 includes not the guide sleeve 259 according to the third embodiment but the guide sleeve 159 according to the second embodiment. Additionally, the opening/closing valve 315 includes an upper valve block 222A and a lower valve block 222B instead of the valve block 222 according to the third embodiment, and a communicating hole 222d is formed in the upper valve block 222A. The second adjusting member 270 can be rotated when a pin inserted through the communicating hole 222d is abutted on and is pressed against the linear knurling pattern of the second adjusting member 270, and thus, the third feature point (which is the length adjustment of the valve assembly 250) can be achieved.

The suck-back valve 317 will be mainly described below. Note that components specific to the fourth embodiment will be denoted with reference numerals, the number in its hundred place of which is 3. The suck-back valve 317 includes a valve housing made of a lower valve block 322B attached above the flow channel block 21, an upper valve block 322A attached above the lower valve block 322B, and an upper block 323 attached above the upper valve block 322A.

A valve body 331 is embedded in the flow channel block 21. The valve body 331 is a diaphragm valve including a shaft 332 at its center in a radial direction, an annular section 333 arranged in the flow channel block 21 and sandwiched between the flow channel block 21 and a sealing member 395, and an elastic deformation section 334 between the annular section 333 and the shaft 332, and is made of fluororesin. The suck-back chamber 335 protruding into the flow channel 28b is formed below the valve body 331. The valve body 331 is movable in the first direction B1, and the volume of the suck-back chamber 335 is changed by this motion.

A guide sleeve 359 is fixed in the upper block 323. The guide sleeve 359 penetrates through the upper block 323 (or the valve housing) in the second direction B2. The guide sleeve 359 is hollow, and the hollow section is an insertion hole 352. The one side of the inner circumference of the guide sleeve 359 in the second direction B2 includes a female screw formed thereon. A lower portion of the guide sleeve 359 is provided with a cutout. This cutout is fitted in a first adjusting member 337 described later. By this fitting, the rotation of the first adjusting member 337 is prevented as similar to the description of the second embodiment, and the motion of the first adjusting member 337 in the second direction B2 is prevented.

The operation shaft 351a is mounted into the guide sleeve 359. The operation shaft 351a includes the shaft section 353, the straight section 360, the tapered shaft section 354, and the head 358 in this order from the one side toward the other side in the second direction B2. The outer circumference of the shaft section 353 includes a male screw formed thereon. The one side of the shaft section 353 in the second direction B2 is provided with the operation section 357. The other side of the shaft section 353 in the second direction B2 is screwed to the female screw of the guide sleeve 359. The locknut 364 is screwed between the guide sleeve 359 and the operation section 357 in the shaft section 353. The tapered shaft section 354 includes a taper section formed thereon, a diameter of which decreases from the one side toward the other side in the second direction B2. The head 358 and the straight section 360 are guided by the guide sleeve 359.

The valve assembly 350 provided with the valve body 331 is mounted on the valve housing to be movable in the first direction B1. The valve assembly 350 is housed in the hollow part of the upper valve block 322A and the lower valve block 322B.

The valve assembly 350 includes the first adjusting member 337, the second adjusting member 370, and the piston 390. The first adjusting member 337, the second adjusting member 370, and the piston 390 are arranged in coaxial with the shaft 332 of the valve body 331 in this order from the other side toward the one side in the first direction B1.

The first adjusting member 337 includes a shaft and a head in this order from the one side toward the other side in the first direction B1. The outer circumference of the shaft includes a male screw formed thereon. The head is provided with a contact section being in contact with the tapered shaft section 354.

A center of the second adjusting member 370 includes a hollow section. The inner circumference of the hollow section includes a female screw formed thereon. The first adjusting member 337 is screwed to the second adjusting member 370 when the male screw formed on the shaft of the first adjusting member 337 is screwed to the female screw formed on the hollow section. Linear knurling pattern is formed on the outer circumference of the second adjusting member 370. The upper valve block 322A includes a communicating hole 322d communicating with the second adjusting member 370, formed thereon, and the second adjusting member 370 can be rotated when a pin inserted through the communicating hole 322d is abutted on and pressed against the linear knurling pattern.

The piston 390 is housed in a cylinder unit 399 formed in the upper valve block 322A and the lower valve block 322B to be reciprocable in the first direction B1 (up-and-down direction). The cylinder unit 399 is partitioned into a spring unit 399a and a pressure unit 399b by the piston 390.

A second compressed spring 391 is embedded in the spring unit 399a. The second compressed spring 391 applies spring force to the valve body 31 through the piston 390 in the direction bringing the valve body 31 away from the valve seat 36, in other words, toward the other side (upward) in the first direction B1. A packing 392 seals between the spring unit 399a and the pressure unit 399b.

The sealing member 395 is arranged on the one side (lower side) of the hollow section of the lower valve block 322B in the first direction B1. An O-ring 398 seals between the lower valve block 322B and the sealing member 395.

A supply/discharge port 322c communicating with the pressure unit 399b is formed in the lower valve block 322B. The piston 390 is reciprocated in the cylinder unit 399 in the first direction B1 by the fluid supplied/discharged from the supply/discharge port 322c. An actuator made of the cylinder unit 399, the piston 390, the spring 391, and the like is formed in the upper valve block 322A and the lower valve block 322B.

A washer 381 abutting on the second adjusting member 370 is arranged. A first compressed spring 349 that is a spring member interposes between the washer 381 and the lower valve block 322B. The first compressed spring 349 applies bias force to the first washer 381 and the second adjusting member 370 screwed to the first adjusting member 337 toward the other side (upward) in the first direction B1.

Figure 18:
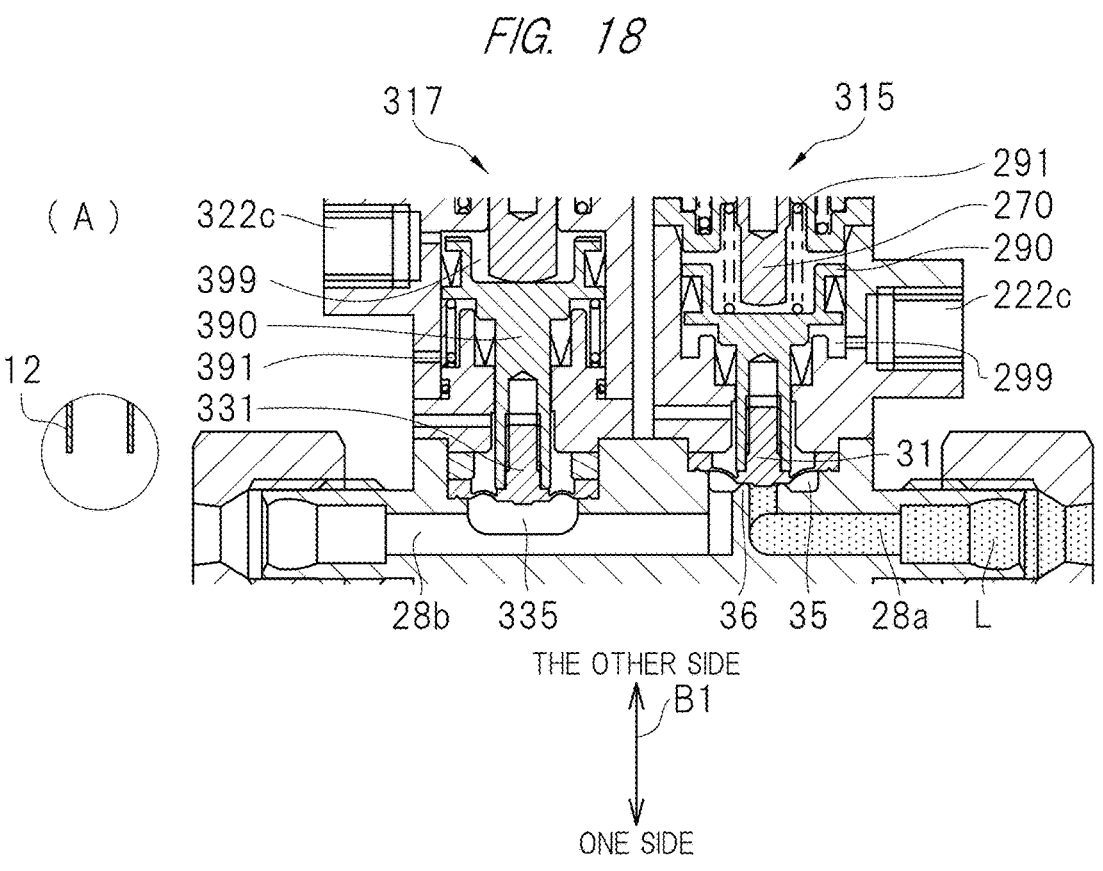
FIG. 18 is a diagram for explaining operations of the suck-back valve and the opening/closing valve.
Figure 18:
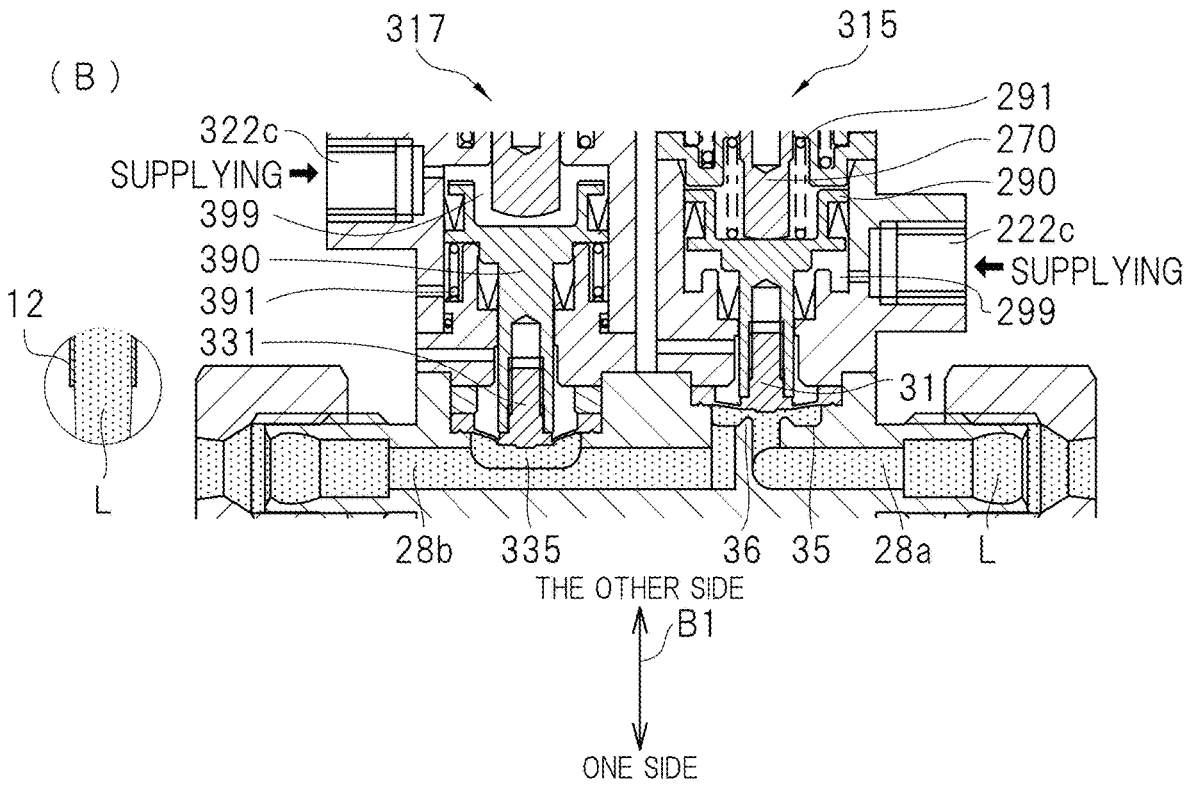
Figure 19:
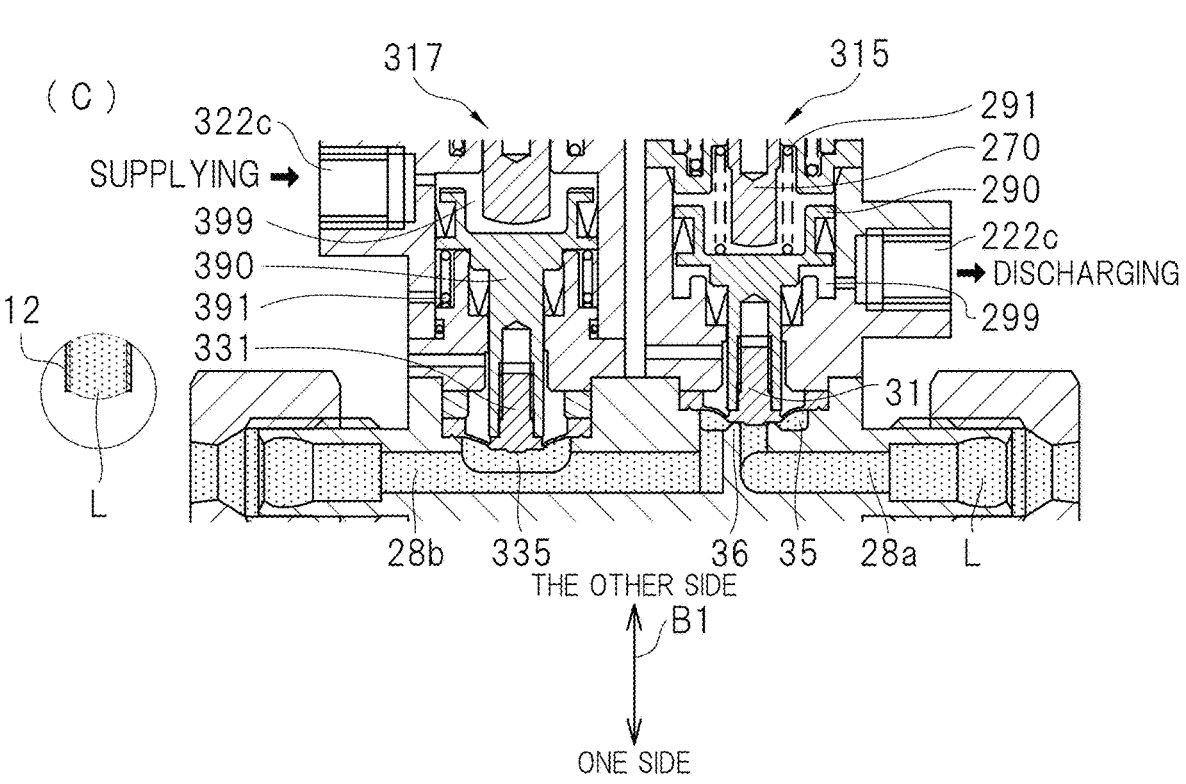
FIG. 19 is a diagram continued from FIG. 18.
Figure 19:
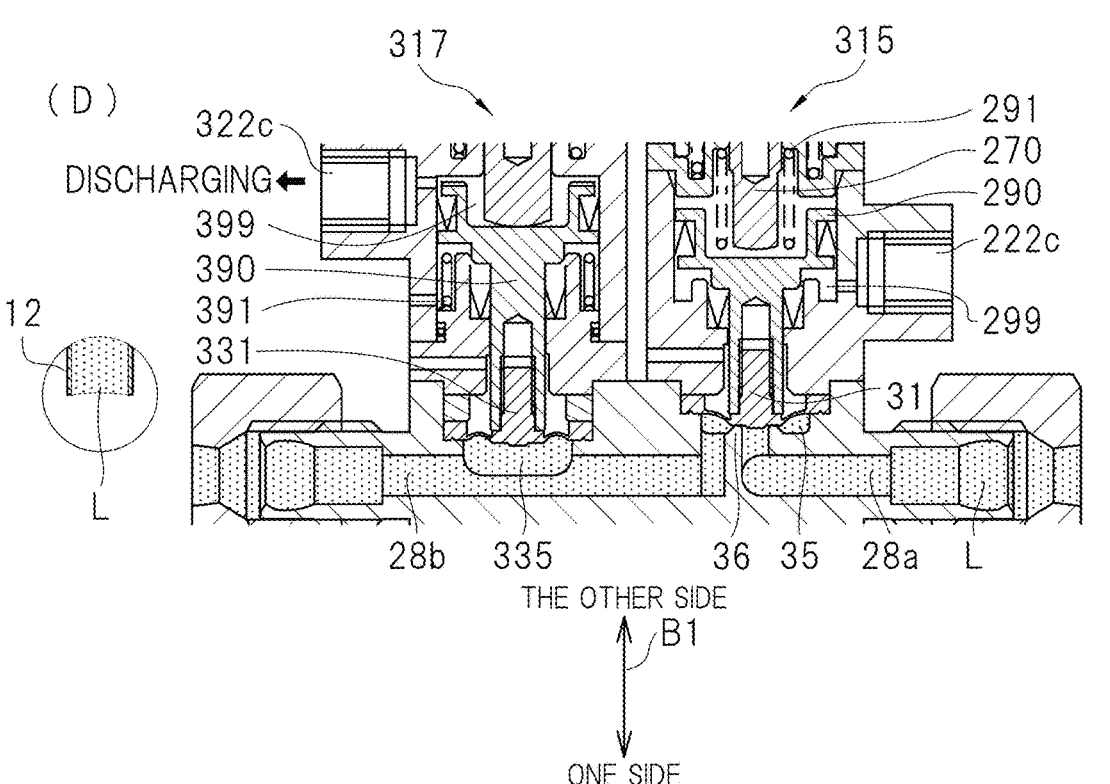

Next, operations of the suck-back valve 317 and the opening/closing valve 315 will be described. The suck-back valve 317 and the opening/closing valve 315 are arranged between the pump 14 and the application nozzle 12 in the liquid supply apparatus 10 of FIG. 1. That is, the liquid L housed in the liquid container 11 is pumped up by the pump 14 through the liquid supply pipe 13, flows into the opening/closing valve 315, flows out of the suck-back valve 317, and is supplied to the application nozzle 12. Note that a flow-rate regulator valve may be arranged in front of or behind the suck-back valve 317 and the opening/closing valve 315. FIG. 18 and FIG. 19 are diagrams for explaining the operations of the suck-back valve 317 and the opening/closing valve 315. The liquid L is illustrated with dots in FIG. 18 and FIG. 19.

FIG. 18(A) illustrates a position (referred to as "volume expanded position" below) where the valve body 331 of the suck-back valve 317 ascends to expand the volume of the suck-back chamber 335, that is a position where the valve body 31 of the opening/closing valve 315 descends to be fully closed. Thus, the liquid L flowing from the liquid container 11 into the flow channel 28a is shut off by the valve body 31.

Next, as illustrated in FIG. 18(B), when the fluid (such as compressed air) is suppled from the supply/discharge port 222c to the pressure unit 299b through the opening/closing valve 315, the piston 290 is moved toward the other side (upward) in the first direction B1 to be against the bias force of the second compressed spring 291 by the pressure of the fluid, and the valve body 31 moves away from the valve seat 36. The valve body 31 reaches the fully opened position, and the liquid L flows from the flow channel 28a to the flow channel 28b through the communicating unit 35. Then, the liquid L flows out of the application nozzle 12.

At this time, the suck-back valve 317 is set at a position (referred to as "volume reduced position" below) where the volume of the suck-back chamber 335 is reduced by descending of the valve body 331. When the fluid (such as compressed air) is supplied from the supply/discharge port 322c to the pressure unit 399b, the piston 390 is moved toward the one side (downward) in the first direction B1 to be against the bias force of the second compressed spring 391 by the pressure of the fluid, the valve body 331 reaches the volume reduced position, and the volume of the suck-back chamber 335 is reduced.

Next, as illustrated in FIG. 19(C), when the fluid in the pressure unit 299b is discharged from the supply/discharge port 222c through the opening/closing valve 315, the piston 290 is moved toward the one side (downward) in the first direction B1 by the bias force of the second compressed spring 291, and the valve body 31 abuts on the valve seat 36. Then, the valve body 31 reaches the fully closed position, the communication between the flow channel 28a and the flow channel 28b is shut off, and the liquid L does not flow. At this time, the liquid L supplied to the application nozzle 12 almost starts to drop from the end of the application nozzle 12.

Next, as illustrated in FIG. 19(D), the valve body 331 in the suck-back valve 317 is ascended to the volume expanded position. When the fluid in the pressure unit 399b is discharged from the supply/discharge port 322c, the piston 390 is moved toward the other side (upward) in the first direction B1 by the bias force of the second compressed spring 391, the valve body 331 reaches the volume expanded position, and the volume of the suck-back chamber 335 is expanded. The liquid L supplied to the application nozzle 12 is drawn back from the end of the application nozzle 12. As a result, the dropping out of the liquid L from the application nozzle 12 is prevented.

The first to third feature points of the suck-back valve 317 and the opening/closing valve 315 will be described herein. The first to third feature points of the opening/closing valve 315 have the same effects as those of the first to third feature points of the opening/closing valve 215 according to the third embodiment.

The first feature point of the suck-back valve 317 (in which the volume expanded position of the valve body 331 can be adjusted by the motion of the operation shaft 51a including the tapered shaft section 54) is to adjust a gap between the lower end of the second adjusting member 370 and its opposing end surface of the piston 390, in other words, adjust a stroke of the actuator. By the operator's operation on the operation section 357, the operation shaft 351a is rotated, and is moved in the second direction B2 relative to the upper block 323. Then, the contact position between the tapered shaft section 354 of the operation shaft 351a and the first adjusting member 337 changes to move the first adjusting member 337 and the second adjusting member 370 in the first direction B1 relative to the upper block 323, and to adjust the gap between the second adjusting member 370 and the piston 390. The piston 390 reciprocates in the gap. The second adjusting member 370 limits the motion amount of the piston 390 toward the other side in the first direction.

Specifically, when the operation shaft 351a moves toward the other side (rightward) in the second direction B2 to change the contact position of the first adjusting member 337 from the larger-diameter portion of the tapered shaft section 354 to the smaller-diameter portion thereof, the first adjusting member 337 and the second adjusting member 370 move toward the other side (upward) in the first direction B1 by the bias force of the first compressed spring 349, and the gap between the second adjusting member 370 and the piston 390 increases. To the contrary, when the operation shaft 351a moves toward the one side (leftward) in the second direction B2 to change the contact position of the first adjusting member 337 from the smaller-diameter portion of the tapered shaft section 354 to the larger-diameter portion thereof, the first adjusting member 337 and the second adjusting member 370 move toward the one side (downward) in the first direction B1 by the bias force of the first compressed spring 349, and the gap between the second adjusting member 370 and the piston 390 decreases. As described above, when the gap that is the stroke of the actuator is adjusted by the operation shaft 51a, the volume expanded position of the valve body 31 is set.

Next, the second feature point of the suck-back valve 317 (in which the guide sleeve 359 penetrates through the upper block 323 in the second direction B2) will be described. The first adjusting member 337 and the second adjusting member 370 are pushed up toward the other side (upward) in the first direction B1 by the bias force of the first compressed spring 349, and the operation shaft 351a being in contact with the first adjusting member 337 is pressed against the upper side of the inner circumference of the guide sleeve 359 penetrating through the upper block 323 in the second direction B2. As a result, the operation shaft 351a abuts on the inner circumference of the guide sleeve 359 at two portions at two portions that are the head 358 and the straight section 360. Therefore, fluctuation in the operating can be reduced, and the position of the operation shaft 51a is fixed. Additionally, since the through-hole 55 of the adjusting member 37 and the enclosure hole 38 of the upper block 23 as described in the flow-rate regulator valve 16 according to the first embodiment (see FIG. 3) do not need to be provided, the suck-back valve 317 can be downsized.

Next, the third feature point of the suck-back valve 317 (in which the length adjusting mechanism for the valve assembly 350 is provided) will be described. The third feature point is to adjust the gap between the first adjusting member 337 and the second adjusting member 370. The first adjusting member 337 is not rotatable, the second adjusting member 370 is rotatable, and the washer 381 is not rotatable. By the rotation of the second adjusting member 370 in this state, a gap between the first adjusting member 337 and the second adjusting member 370 is changed to adjust the length of the valve assembly 350 in the first direction B1. Additionally, even by the rotation of the second adjusting member 370, the washer 281 abutting on the second adjusting member 370 is not rotated, and thus, the first compressed spring 349 biasing the first washer 381 is not twisted.

The gap between the first adjusting member 337 and the second adjusting member 370 is adjusted while the larger-diameter portion of the tapered shaft section 354 of the operation shaft 351a is in contact with the first adjusting member 337 as illustrated in FIG. 17.

By the rightward rotation of the second adjusting member 370 in this state, the gap between the first adjusting member 337 and the second adjusting member 370 is decreased, a gap is formed between the second adjusting member 370 and the piston 390, and thus, a pressing pressure on the valve body 331 is weakened. The adjustment is made when the pressing pressure on the valve body 331 is strong.

To the contrary, by the leftward rotation of the second adjusting member 370 therein, the gap between the first adjusting member 337 and the second adjusting member 370 is increased, the pressing pressure onto the piston 390 caused by the second adjusting member 370 is strengthened, and thus, the pressing pressure on the valve body 331 is also strengthened. The adjustment is made when the pressing pressure on the valve body 331 is weak.

Fifth Embodiment

Figure 20:
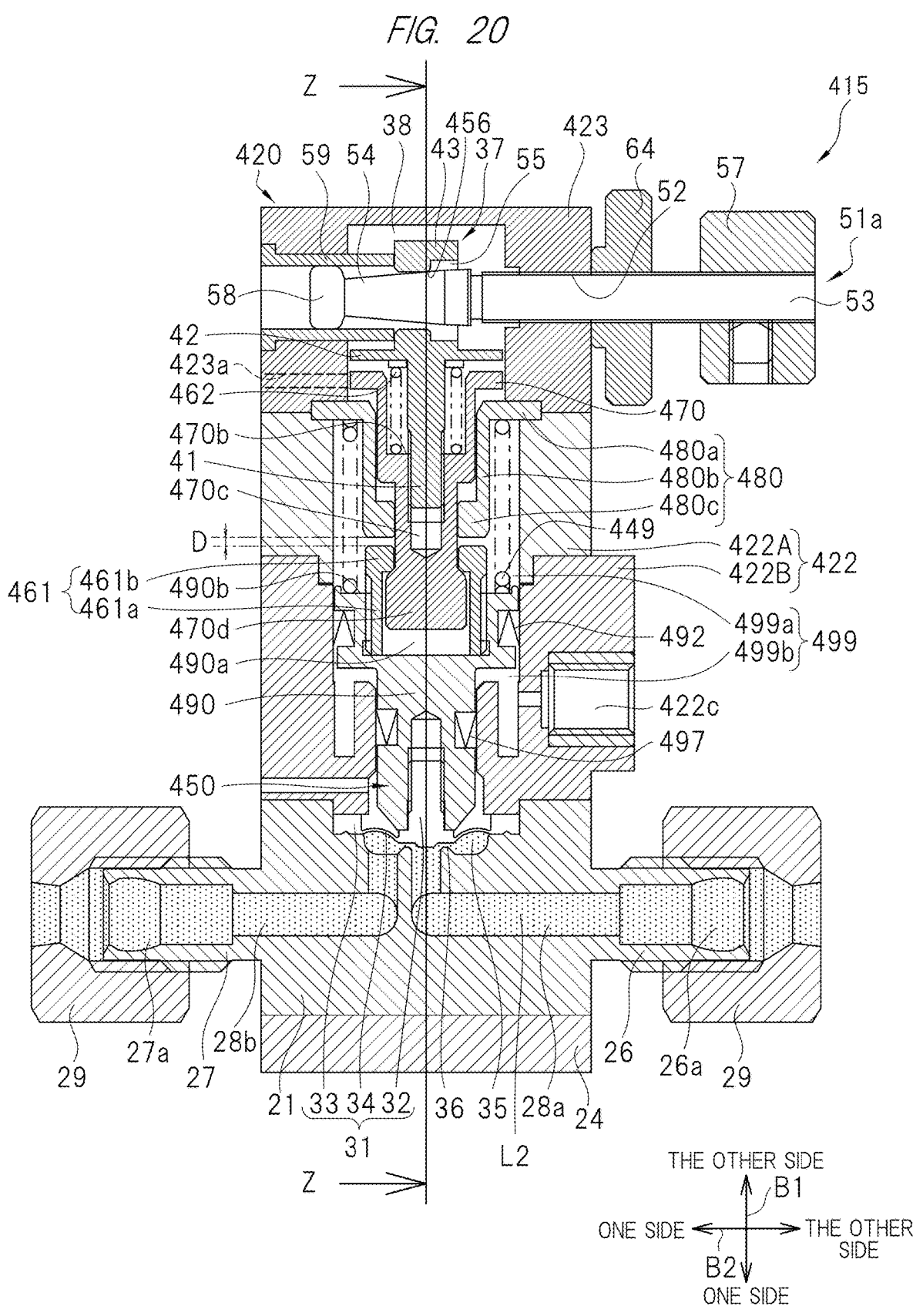
FIG. 20 is a front cross-sectional view illustrating a slow-leak valve as an exemplary control valve according to a fifth embodiment.

FIG. 20 is a front cross-sectional view illustrating a slow-leak valve 415 as an exemplary control valve according to a fifth embodiment. The slow-leak valve 415 according to the fifth embodiment is a flow-rate regulator valve which reciprocates between a position where the valve body 31 is nearest to the valve seat 36 and the fully opened position (see FIG. 22). As illustrated in FIG. 20, the position where the valve body 31 is nearest to the valve seat 36 is, for example, a low flow-rate position where the valve body 31 is not in contact with and is slightly away from the valve seat 36 to flow the fluid of a low flow rate from the flow channel.

The slow-leak valve 415 according to the fifth embodiment has the first feature point (in which the low flow-rate position of the valve body 31 can be adjusted by operation on the operation shaft 51a including the tapered shaft section 54) and the third feature point (in which the length adjusting mechanism for a valve assembly 450 is provided). Components specific to the fifth embodiment will be denoted with reference numerals, the number in its hundred place of which is 4.

The slow-leak valve 415 includes a valve housing 420 made of a plurality of blocks. The valve housing 420 is made of the flow channel block 21 arranged above the support plate 24, a valve block 422 attached above the flow channel block 21, and an upper block 423 attached above the valve block 422. The valve block 422 is made of an upper valve block 422A and a bottom valve block 422B.

The first joint 26, the inflow/outflow port 26a, the second joint 27, the inflow/outflow port 27a, the inflow channel 28a, the outflow channel 28b, and the union nut 29 in the flow channel block 21 have the same configurations and functions as those of the first embodiment and the second embodiment. Further, the shaft 32, the annular section 33, and the elastic deformation section 34 in the valve body 31 (diaphragm valve), the communicating unit 35, and the valve seat 36 also have the same configurations and functions as those of the first embodiment and the second embodiment. Furthermore, the adjusting member 37 and the guide sleeve 59 in the upper block 423 have the same configurations and functions as those of the first embodiment.

The valve assembly 450 includes the adjusting member 37 as a first adjusting member, a second adjusting member 470, and a piston 490. The valve assembly 450 is arranged in coaxial with the shaft 32 of the valve body 31 to extend from the other side toward the one side in the first direction B1.

A center of the second adjusting member 470 includes a hollow section 170c. The inner circumference of the hollow section 470c includes a female screw formed thereon. The adjusting member 37 is screwed to the second adjusting member 470 when the male screw formed on the shaft 41 of the adjusting member 37 is screwed to the female screw formed on the hollow section 470c.

Linear knurling pattern is formed on the outer circumference of the second adjusting member 470. The upper block 423 includes a communicating hole 423a communicating with the second adjusting member 470, formed thereon, and the second adjusting member 470 can be rotated when a pin inserted through the communicating hole 423*a* is abutted on and pressed against the linear knurling pattern.

A compressed coil spring 462 as a spring member is provided between a step 470*b* of the second adjusting member 470 and the flange 42 of the adjusting member 37. The compressed coil spring 462 applies bias force to the second adjusting member 470 toward the one side (downward) in the first direction B1. Fluctuation between the male screw of the shaft 41 and the female screw of the hollow section 470*c*, which is caused by reciprocation of the piston 490, is prevented by the bias force of the compressed coil spring 462.

A guide member 480 configured to house the adjusting member 37 and the second adjusting member 470 and to guide motion of the second adjusting member 470 in the first direction B1 is provided in the valve block 422. The guide member 480 includes a flange 480*a* sandwiched and fixed between the upper block 423 and the valve block 422, a tube 480*b* configured to house the adjusting member 37 and the second adjusting member 470, and a bottom 480*c* in this order from the other side (upper side) toward the one side (lower side) in the first direction B1. The bottom 480*c* is provided with a through-hole, and the second adjusting member 470 penetrates through the through-hole. The second adjusting member 470 is guided to the tube 480*b* of the guide member 480, and its motion in the first direction B1 is made stable.

The piston 490 includes a concave 490*a* formed thereon, and a coupling piece 461 is coupled with the concave 490*a*. The inner circumference of the concave 490*a* includes a female screw formed thereon. The coupling piece 461 includes a tube 461*a*, the outer circumference of which includes a male screw formed thereon, and a lid 461*b*, in this order from the one side (lower side) toward the other side (upper side) in the first direction B1. When the male screw formed on the tube 461*a* is screwed to the female screw formed on the concave 490*a*, the coupling piece 461 is screwed to the piston. The coupling piece 461 is a part of the piston 490.

The lid 461*b* is provided with a through-hole, and the second adjusting member 470 penetrates through the through-hole. An end of the one side (lower side) of the second adjusting member 470 in the first direction B1 is provided with a stopper 470*d* embedded in the tube 461*a*. The motion amount of the piston 490 toward the one side (downward) in the first direction B1 is limited when the stopper 470*d* is in contact with the lid 461*b* of the coupling piece 461.

The piston 490 is housed in a cylinder unit 499 formed in the valve block 422 to be reciprocable in the first direction B1 (up-and-down direction). The cylinder unit 499 is partitioned into a spring unit 499*a* and a pressure unit 499*b* by the piston 490.

A compressed coil spring 449 as a spring member is embedded in the spring unit 499*a*. The compressed coil spring 449 applies spring force to the valve body 31 through the piston 490 toward the one side (downward) in the first direction B1. A packing 492 seals between the spring unit 499*a* and the pressure unit 499*b*.

A packing 497 mounted on the piston 490 seals the one side (lower side) of the hollow section of the bottom valve block 422B in the first direction B1. The bottom valve block 422B includes a supply/discharge port 422*c* communicating with the pressure unit 499*b*, formed thereon. The piston 490 is reciprocated in the cylinder unit 499 in the first direction B1 by the fluid supplied/discharged from the supply/discharge port 422*c*. An actuator made of the cylinder unit 499, the piston 490, the spring 449, and the like is formed in the valve block 422. One end of the compressed coil spring 449 abuts on a step 490*b* of the piston 490 while the other end thereof abuts on the flange 480*a* of the guide member 480.

Figure 21:
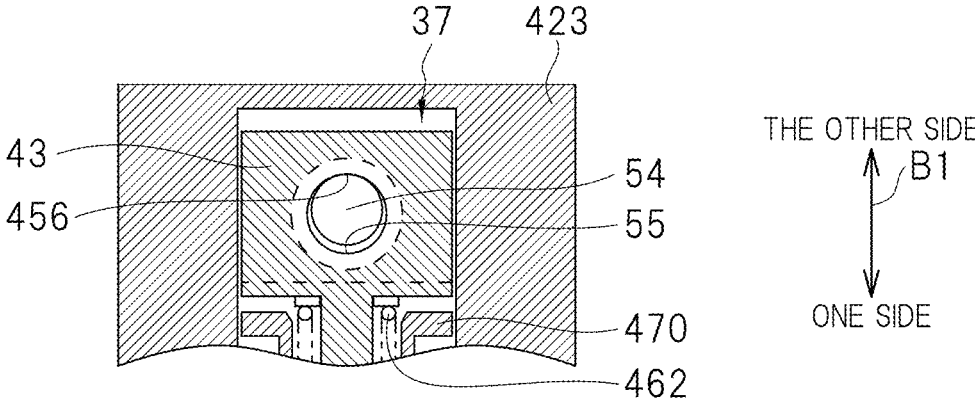
FIG. 21 is a cross-sectional view taken along the line Z-Z of FIG. 20.

The operation shaft 51*a* is mounted on the upper block 423 as similar to the first embodiment. A difference from the first embodiment is that an upper portion of the inner surface of the through-hole 55 formed in the drive piece 43 of the adjusting member 37 is a contact section 456 while the tapered shaft section 54 is in contact with the contact section 456 as illustrated in FIG. 21.

Figure 22:
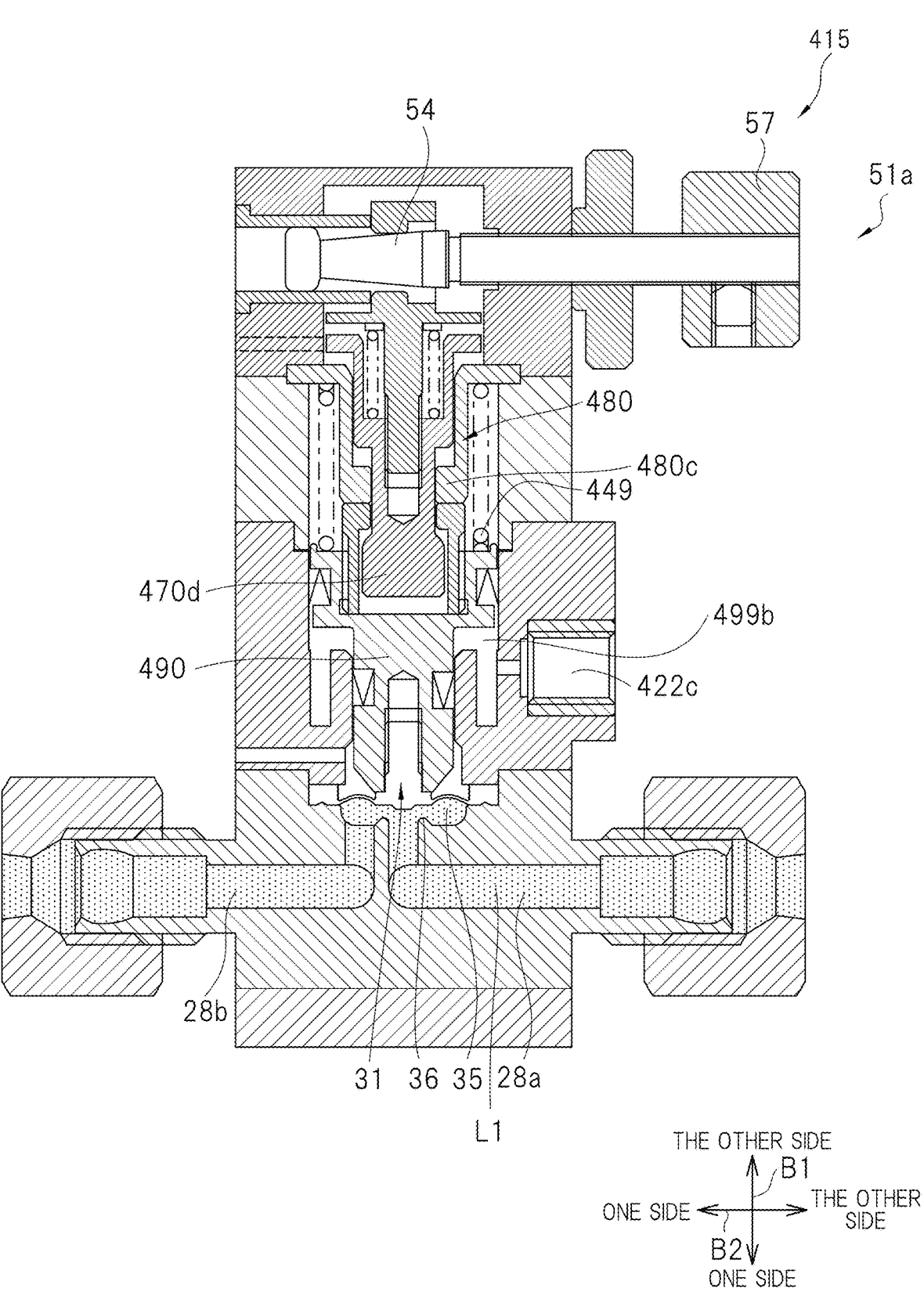
FIG. 22 is a front cross-sectional view illustrating the slow-leak valve in a state in which a valve body is at a full open position.

Next, operations of the piston 490 and the valve body 31 will be described. As illustrated in FIG. 20, a gap "D" is set between the bottom 480*c* of the guide member 480 and the lid 461*b* of the coupling piece 461 by the rotation of the operation shaft 51*a*. The gap D is a stroke of the reciprocation of the piston 490 in the first direction B1. When the fluid (such as compressed air) is supplied from the supply/discharge port 422*c* to the pressure unit 499*b*, the piston 490 moves by the gap D toward the other side (upward) in the first direction B1 by the pressure of the fluid to be against the bias force of the compressed coil spring 449. Then, the valve body 31 moves away from the valve seat 36, the lid 461*b* of the coupling piece 461 is in contact with the bottom 480*c* of the guide member 480, and the valve body 31 is positioned at the fully opened position. Then, liquid L1 flows from the flow channel 28*a* to the flow channel 28*b* through the communicating unit 35 as illustrated in FIG. 22.

To the contrary, when the fluid in the pressure unit 499*b* is discharged from the supply/discharge port 422*c*, the piston 490 moves by the gap D toward the one side (downward) in the first direction B1 by the bias force of the compressed coil spring 449 as illustrated in FIG. 20. Then, the lid 461*b* of the coupling piece 461 moves away from the bottom 480*c* of the guide member 480, and the valve body 31 is positioned slightly away from the valve seat 36 without being in contact with the valve seat 36, in other words, is positioned at the low flow-rate position. Then, liquid L2 of a lower flow rate than that of the liquid L1 flows from the channel 28*a* to the channel 28*b*.

The first feature point of the slow-leak valve 415 will be described herein. The first feature point (in which the low flow-rate position of the valve body 31 can be adjusted by the motion of the operation shaft 51*a* including the tapered shaft section 54) is to adjust the gap D between the coupling piece 461 and the guide member 480, in other words, to adjust the stroke of the actuator. By the operator's operation on (to rotate) the operation section 57, the operation shaft 51*a* is moved in the second direction B2 (right-and-left direction) relative to the valve block 422. Then, the contact position between the tapered shaft section 54 of the operation shaft 51*a* and the adjusting member 37 changes to move the adjusting member 37 and the second adjusting member 470 in the first direction B1 (up-and-down direction) relative to the valve block 422, and to adjust the gap D.

Specifically, when the operation shaft 51*a* moves toward the other side (rightward) in the second direction B2 to change the contact position of the adjusting member 37 from the larger-diameter portion of the tapered shaft section 54 to the smaller-diameter portion thereof, the adjusting member 37 and the second adjusting member 470 are descended toward the one side (downward) in the first direction B1. That is, when the piston 490 is moved toward the one side (downward) in the first direction B1 by the bias force of the compressed coil spring 449, the lid 461*b* abuts on the stopper 470*d*, and the gap D increases. At this time, the valve body 31 approaches the valve seat 36, and the low flow-rate position is descended.

To the contrary, when the operation shaft 51*a* moves toward the one side (leftward) in the second direction B2 to change the contact position of the adjusting member 37 from the smaller-diameter portion of the tapered shaft section 54 to the larger-diameter portion thereof, the adjusting member 37 and the second adjusting member 470 are ascended toward the other side (upward) in the first direction B1. That is, when the adjusting member 37 and the second adjusting member 470 bring the stopper 470*d* to abut on the lid 461*d* to be against the bias force of the compressed coil spring 449, and the piston 490 is moved toward the other side (upward) in the first direction B1, and the gap D decreases. At this time, the valve body 31 moves away from the valve seat 36, and the low flow-rate position is ascended.

As described above, the gap that is the stroke of the actuator is adjusted by the operation on the operation shaft 51*a* to accurately adjust the low flow-rate position of the valve body 31.

Figure 23:
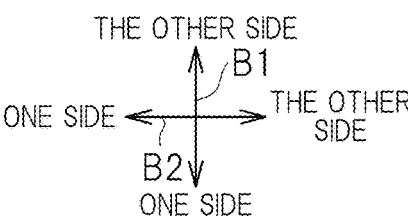
FIG. 23 is a front cross-sectional view illustrating the slow-leak valve in a state in which the valve body is at a low flow-rate position.

As illustrated in FIG. 23, when the operation shaft 51*a* is moved toward the other side (rightward) in the second direction and reaches a position where the end of the tapered shaft section 54 (closer to the straight section 60) is in contact with the upper block 423, in other words, when the operation shaft 51*a* reaches the backward-movement limit position, the stopper 470*d* is not in contact with the coupling piece 461. Then, the stroke of the piston 490 is not limited by the stopper 470*d*. At this time, the valve body 31 is in contact with the valve seat 36 to shut off the flow channels 28*a* and 28*b*, and thus, the slow-leak valve 415 can be used also as an opening/closing valve.

Next, the third feature point of the slow-leak valve 415 (in which a length adjusting mechanism for the valve assembly 450 is provided) will be described. The third feature point is to adjust the gap between the adjusting member 37 and the second adjusting member 470. The adjusting member 37 is not rotatable, the second adjusting member 470 is rotatable, and the guide member 480 is not rotatable. By the rotation of the second adjusting member 470 in this state, the gap between the adjusting member 37 and the second adjusting member 470 is changed to adjust the length of the valve assembly 450 in the first direction B1. Additionally, even by the rotation of the second adjusting member 470, the guide member 480 abutting on the second adjusting member 470 is not rotated, and thus, the compressed coil spring 449 biasing the guide member 480 does not twist.

As illustrated in FIG. 23, the adjustment of the gap between the adjusting member 37 and the second adjusting member 470 is made while the smaller-diameter portion of the tapered shaft section 54 of the operation shaft 51*a* is in contact with the adjusting member 37. At this time, the operation shaft 51*a* is at the backward-movement limit position. When the operation shaft 51*a* is at the backward-movement limit position while the slow-leak valve 415 is used as the opening/closing valve, the stopper 470*d* is not in contact with the coupling piece 461, and thus, the valve body 31 is positioned at the fully closed position. By the rotation of the second adjusting member 470, no contact between the stopper 470*d* and the coupling piece 461 can be adjusted.

Modification Examples

The present invention is not limited to each of the above embodiments, and various modifications can be made within the scope of the present invention.

The opening/closing valve 215 according to the third embodiment, and the opening/closing valve 315 and the suck-back valve 317 according to the fourth embodiment have been described to have the second feature point and the third feature point as example, but may not have the second feature point and the third feature point.

The flow-rate regulator valve 16 according to the first embodiment, the flow-rate regulator valve 116 according to the second embodiment, and the opening/closing valve 315 and the suck-back valve 317 according to the fourth embodiment have been described not to have the fourth feature point as example, but may have the fourth feature point.

In each of the above embodiments, the valve 31, 331 is not limited to the diaphragm valve, and may be a poppet valve or a needle valve.

Regarding the first feature point, the operation shaft 51*a* includes the two taper sections with mutually different taper angles, but three or more taper sections may be formed in the tapered shaft section 54.

The example regarding the third feature point has been described such that the second adjusting member 170 is operated by the pin 171 inserted through the communicating hole 122*a* as illustrated in FIG. 13. However, a screw engaged with the second adjusting member 170 may be provided in the communicating hole 122*a*, and the second adjusting member 170 may be operated by operation on the screw.

Each of the above embodiments has been described such that the operation shaft 51*a*, 351*a* regarding the first feature point is the rotation shaft which is moved in the second direction (right-ad-left direction) by rotation as example. However, the operation shaft may be moved in the second direction by pushing or pulling. This case does not need the male screw formed on the shaft section of the operation shaft 51*a*, 351*a* and the female screw formed in the insertion hole of the upper block.

In the opening/closing valve 315 and the suck-back valve 317 according to the fourth embodiment and the slow-leak valve 415 according to the fifth embodiment, the valve blocks 222, 322, and 422 are made of the upper valve blocks 222A, 322A, and 422A and the lower valve blocks 222B, 322B, and 422B, respectively, but may be integrally configured. Further, the integral formation may include the upper block as illustrated in FIG. 15.

Configurations Included in the Present Invention

Note that the present technique may take the following configurations (1) A flow-rate regulator valve includes:
a valve housing including a flow channel block with a flow channel in which a fluid flows;
a valve assembly mounted on the valve housing to be movable in a shaft direction and being provided with a valve body configured to change a degree of an opening of the flow channel; and
a rotation shaft including a screw shaft section screwed to the valve housing and a tapered shaft section being in contact with the valve assembly,
a degree of an opening of the valve body is adjusted through the tapered shaft section by rotation of the rotation shaft.

(2) In the flow-rate regulator valve according to statement (1),
the valve assembly further includes an adjusting member, and the adjusting member is provided with a contact section coupled to the valve body and being in contact with the tapered shaft section.

(3) In the flow-rate regulator valve according to statement (2), the adjusting member includes a through-hole including the contact section formed thereon, and the tapered shaft section is movable to penetrate through the through-hole and to cross the adjusting member.

(4) In the flow-rate regulator valve according to any one of statements (1) to (3), the rotation shaft includes an operation section, and the rotation shaft is rotated and driven by the operation section.

(5) In the flow-rate regulator valve according to any one of statements (1) to (4), the tapered shaft section includes a plurality of taper surfaces with different taper angles, and the taper angles are made increase in an order from one end toward the other end of the tapered shaft section.

(6) In the flow-rate regulator valve according to any one of statements (1) to (5), the valve body is a diaphragm which forms a communicating unit configured to communicate an inflow side and an outflow side of the flow channel and which moves close to and away from a valve seat provided on the flow channel block.

(7) The flow-rate regulator valve according to any one of statements (1) to (6) further includes a guide sleeve being in contact with the valve assembly and configured to guide the tapered shaft section in its shaft direction.

A control valve according to the present invention can be used to accurately adjust a degree of a communication opening or a volume of a flow channel in which a fluid flows.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A control valve comprising:

a valve housing including a flow channel block with a flow channel in which a fluid flows;

a valve assembly mounted on the valve housing to be movable in a first direction and provided with a valve body configured to change a degree of a communication opening of the flow channel; and an operation shaft including a shaft section inserted into an insertion hole formed in the valve housing and a tapered shaft section being in contact with the valve assembly, wherein a position of the valve body is adjusted through the tapered shaft section by motion of the operation shaft in a second direction, wherein the valve housing includes a valve block configured to house the valve assembly and a spring member, the valve block is provided with the spring member configured to apply spring force in directions of bringing the valve body away from a valve seat through the valve assembly and bringing the valve assembly to be pressed against the tapered shaft section, the valve body is moved to approach the valve seat to be against the spring force by change in a contact position of the valve assembly with the tapered shaft section from a smaller-diameter portion to a larger-diameter portion, the valve body is moved to be away from the valve seat by the spring force by change in the contact position of the valve assembly with the tapered shaft section from the larger-diameter portion to the smaller-diameter portion, and the degree of the communication opening of the flow channel is adjusted by motion of the valve body in the first direction moved by motion of the tapered shaft section in the second direction.

2. The control valve according to claim 1, wherein the tapered shaft section is screwed by a screw provided in the insertion hole, and the position of the valve body is adjusted through the tapered shaft section moving in the second direction by rotation of the operation shaft.

3. The control valve according to claim 1, wherein the operation shaft includes an operation section, and the operation shaft is moved in the second direction by operation on the operation section.

4. The control valve according to claim 1, wherein the tapered shaft section includes a plurality of taper surfaces with different taper angles, taper angles of which increase in an order from one end toward the other end of the tapered shaft section.

5. The control valve according to claim 1, wherein the valve assembly includes: a first adjusting member being in contact with the tapered shaft section; a second adjusting member screwed to the first adjusting member; and a piston being reciprocable in the first direction, and is housed in the valve block, one side of the piston in the first direction is mounted with the valve body and faces the valve seat while the other side of the piston in the first direction faces the second adjusting member across a gap, a cylinder unit provided in the valve block is partitioned into a spring unit and a pressure unit by the piston, the spring unit is provided with the spring member configured to apply spring force through the piston in a direction of bringing the valve body to approach the valve seat, when the fluid is supplied to the pressure unit, the valve body is positioned at a fully opened position by motion of the piston by the gap toward the other side in the first direction to be against spring force applied to the valve body by the spring member, and, when the fluid is discharged from the pressure unit, the valve body is positioned at a fully closed position by motion of the piston by the gap toward one side in the first direction by the spring member, and the fully opened position is adjusted by change in the gap through the first adjusting member, changed by motion of the operation shaft in the second direction to limit a motion amount of the piston toward the other side in the first direction.

6. The control valve according to claim 1, wherein the valve assembly includes: a first adjusting member being in contact with the tapered shaft section; a second adjusting member screwed to the first adjusting member; and a piston being reciprocable in the first direction, and is housed in the valve block, one side of the piston in the first direction is mounted with the valve body and faces the valve seat while the other side of the piston in the first direction faces the second adjusting member across a gap, a cylinder unit provided in the valve block is partitioned into a spring unit and a pressure unit by the piston, the spring unit is provided with the spring member configured to apply spring force through the piston in a direction of bringing the valve body to be away from the valve seat, when the fluid is supplied to the pressure unit, the valve body is positioned at a volume reduced position by motion of the piston by the gap toward one side in the first direction to be against spring force applied to the valve body by the spring member, and when the fluid is discharged from the pressure unit, the valve body is positioned at a volume expanded position by motion of the piston by the gap toward the other side in the first direction by the spring member, and the volume expanded position is adjusted by change in the gap through the first adjusting member, changed by motion of the operation shaft in the second direction to limit a motion amount of the piston toward the other side in the first direction.

7. The control valve according to claim 1, wherein the valve assembly includes: a first adjusting member being in contact with the tapered shaft section; a second adjusting member screwed to the first adjusting member; a guide member configured to guide the first adjusting member and the second adjusting member; and a piston being reciprocable in the first direction, and is housed in the valve block, one side of the piston in the first direction is mounted with the valve body and faces the valve seat while the other side of the piston in the first direction faces the guide member across a gap, the second adjusting member includes a stopper engaged with the piston and configured to limit a position of the piston toward one side in the first direction, a cylinder unit provided in the valve block is partitioned into a spring unit and a pressure unit by the piston, the spring unit is provided with the spring member configured to apply spring force through the piston in a direction of bringing the valve body to approach the valve seat, when the fluid is supplied to the pressure unit, the valve body is positioned at a fully opened position by motion of the piston by the gap toward the other side in the first direction to be against spring force applied to the valve body by the spring member, and, when the fluid is discharged from the pressure unit, the valve body is positioned at a low flow-rate position where the valve body is nearest to the valve seat by motion of the piston by the gap toward one side in the first direction by the spring member, and the low flow-rate position is adjusted by change in the gap through the first adjusting member, changed by motion of the operation shaft in the second direction to limit a motion amount of the piston toward one side in the first direction.

8. The control valve according to claim 1, wherein the valve body is a diaphragm valve including: an annular section arranged in the flow channel block; a shaft attached to the valve assembly; and an elastic deformation section between the annular section and the shaft.

9. The control valve according to claim 1, wherein the valve assembly includes a length adjusting mechanism capable of adjusting a length of the valve assembly in the first direction, wherein the length adjusting mechanism includes a first adjusting member and a second adjusting member, the first adjusting member is screwed to the second adjusting member, a gap is formed between the first adjusting member and the second adjusting member, and a length of the valve assembly in the first direction is adjusted by change in the gap changed by rotation of the second adjusting member.

10. The control valve according to claim 9, wherein the valve housing includes a communicating hole communicating with the second adjusting member, and the second adjusting member is operated through the communicating hole.

11. The control valve according to claim 1, further comprising:

a guide sleeve being in contact with the valve assembly and configured to guide the tapered shaft section in the second direction.

12. The control valve according to claim 11, wherein the guide sleeve penetrates through the valve housing in the second direction.

13. The control valve according to claim 12, further comprising:

a locknut including a screw screwed to the operation shaft, and a fastening surface configured to press an end surface of the guide sleeve toward one side in the section direction by screwing the operation shaft and the screw, and configured to fix a position of the operation shaft, wherein a step is formed between the guide sleeve and the operation shaft, a flange nut and a spring member are housed in the step, and the flange nut includes a tube screwed to the operation shaft, and a flange pressed toward the other side in the second direction by biasing of the spring member.

* * * * *